(12) United States Patent
Corbin et al.

(10) Patent No.: US 7,618,671 B2
(45) Date of Patent: *Nov. 17, 2009

(54) RECOVERY OF ISOFLAVONES AND REMOVAL OF OLIGOSACCHARIDES FROM AQUEOUS MIXTURES USING ZEOLITES

(75) Inventors: David Richard Corbin, West Chester, PA (US); Vasantha Nagarajan, Wilmington, DE (US); Vidya Pai, Wilmington, DE (US); Stuart M. Thomas, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 723 days.

This patent is subject to a terminal disclaimer.

(21) Appl. No.: 10/983,125

(22) Filed: Nov. 5, 2004

(65) Prior Publication Data

US 2005/0202140 A1 Sep. 15, 2005

Related U.S. Application Data

(60) Provisional application No. 60/517,734, filed on Nov. 5, 2003.

(51) Int. Cl.
*A23L 1/20* (2006.01)
*A23L 1/36* (2006.01)
*A23L 2/00* (2006.01)
*A61K 36/48* (2006.01)
*C01B 33/36* (2006.01)

(52) U.S. Cl. ............... 426/634; 423/713; 423/DIG. 21; 423/DIG. 27; 424/757; 426/590; 426/629

(58) Field of Classification Search ............. 426/634, 426/629
See application file for complete search history.

(56) References Cited

U.S. PATENT DOCUMENTS

| 3,308,069 | A | * | 3/1967 | Rosinski et. al. ............. 502/62 |
| 3,506,400 | A |   | 4/1970 | Eberly, Jr. et al. |
| 4,405,377 | A | * | 9/1983 | Neuzil ..................... 127/46.2 |
| 4,483,980 | A |   | 11/1984 | Neuzil et al. |
| 4,503,023 | A |   | 3/1985 | Breck et al. |
| 5,310,534 | A | * | 5/1994 | Fajula et al. .............. 423/715 |
| 5,482,631 | A | * | 1/1996 | Saska et al. .............. 210/635 |
| 5,702,752 | A |   | 12/1997 | Gugger et al. |

(Continued)

FOREIGN PATENT DOCUMENTS

JP 7-82287 3/1995

(Continued)

OTHER PUBLICATIONS

English translation of KR10-2000-0055133 (see above).*

(Continued)

*Primary Examiner*—David R Sample
*Assistant Examiner*—Brent T O'Hern

(57) ABSTRACT

The present invention provides a process using zeolites for recovering isoflavones and removing undesired oligosaccharides from aqueous mixtures, such as soy whey and other plant processing waste products. The aqueous mixture is treated with a large pore hydrophobic zeolite, such as zeolite Beta, to remove isoflavones, followed by treatment with an ultrastabilized, hydrophobic zeolite Y, such as CBV-901 or HiSiv™ 4000, to remove the undesired oligosaccharides raffinose and stachyose. The recovered isoflavones and digestible sugars, glucose, sucrose, and fructose, are useful in food products.

19 Claims, 8 Drawing Sheets

U.S. PATENT DOCUMENTS

| | | | |
|---|---|---|---|
| 5,792,503 A | | 8/1998 | Gugger et al. |
| 5,972,995 A | | 10/1999 | Fischer et al. |
| 6,033,714 A | * | 3/2000 | Gugger et al. .............. 426/634 |
| 6,261,565 B1 | | 7/2001 | Empie et al. |
| 6,521,208 B1 | * | 2/2003 | Cooper et al. ............... 423/713 |
| 6,663,805 B1 | * | 12/2003 | Ekiner et al. ............... 264/45.9 |
| 6,797,309 B2 | * | 9/2004 | Monagle ..................... 426/590 |
| 2002/0119208 A1 | * | 8/2002 | Chajuss ....................... 424/757 |

FOREIGN PATENT DOCUMENTS

| | | | |
|---|---|---|---|
| KR | 10-2000-0055133 | * | 9/2000 |
| KR | 2000-0055133 | | 9/2000 |
| WO | WO 00/51940 | | 9/2000 |

OTHER PUBLICATIONS

Sen et al., Organic Transformations using Zeolites and Zeotype Materials, Tetrahedron report No. 508 (1999), pp. 12657-112698.*

EPA, Technical Bulletin, Zeolite a Versatile Air Pollutant Adsorber (1998).*

Yasuhito Matsubara et al., Recovery of Oligosaccharides from Steamed Soybean Waste Water in Tofu Processing by Reverse Osmosis and Nanofiltration Membranes, Biosci. Biotech. Biochem., vol. 60(3):421-428, 1996.

Christoph Buttersack et al., Specific Adsorption of Saccharides by Dealuminated Y-Zeolites, J. Phys. Chem., vol. 97:11861-11864, 1993.

Christoph Buttersack et al., High Specific Interaction of Polymers with the Pores of Hydrophobic Zeolites, Langmuir, vol. 12(13):3101-3106, 1996.

* cited by examiner

RECOVERY OF ISOFLAVONES AND REMOVAL OF OLIGOSACCHARIDES FROM AQUEOUS MIXTURES USING ZEOLITES

FIELD OF THE INVENTION

The present invention relates to a process for recovering isoflavones and removing undesired oligosaccharides from aqueous mixtures using zeolites.

BACKGROUND OF THE INVENTION

Isoflavones are crystalline ketones found primarily in leguminous plants. One of the most important sources of isoflavones is the soybean, which contains twelve distinct isoflavones: genistein, genistin, 6"-O-malonylgenistin, 6"-O-acetylgenistin, daidzein, daidzin, 6"-O-malonyldaidzin, 6"-O-acetyldaidzin, glycitein, glycitin, 6"-O-malonylglycitin, and 6"-O-acetylglycitin (Kudou, *Agric. Biol. Chem.* 55, 2227-2233, 1991). These soybean isoflavones share the generic structure shown below:

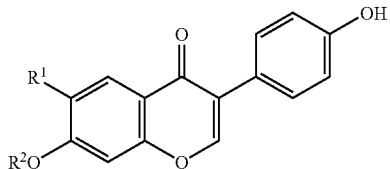

where $R^1$=H, OH, or $OCH_3$;

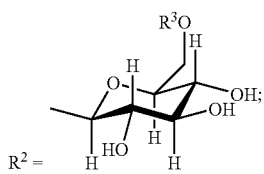

and $R^3$=H, $CH_3C(O)$ or $HOOCCH_2C(O)$.

Dietary isoflavones are believed to have health benefits. For example, they are believed to be responsible for the cholesterol-lowering effect of soy products and may help prevent breast cancer. Moreover, isoflavones are believed to ameliorate menopausal symptoms. U.S. Pat. No. 5,972,995 teaches the treatment of cystic fibrosis patients by administering isoflavones capable to stimulate chloride transport.

Soy protein isolates are typically prepared from defatted soy meal. Proteins and soluble carbohydrates are extracted into aqueous solution at about pH 7-10. The insoluble residue is mostly fiber and is removed by centrifugation. The protein is precipitated from solution as curd at its isoelectric point (about pH 4.5), further purified, neutralized, and dried. The liquid remaining after the protein has been isolated is referred to as whey and contains mainly soluble carbohydrates. Most of the isoflavones are retrieved with the protein curd.

Isoflavones also exist at the parts per million (ppm) level in the whey. Soy whey also contains carbohydrates, primarily sugars such as the monosaccharides glucose and fructose and the oligosaccharides sucrose (disaccharide), raffinose (trisaccharide) and stachyose (tetrasaccharide), in addition to proteins, salts and other bioactives. The oligosaccharides raffinose and stachyose require the enzyme α-galactosidase, which is not present in the human gastrointestinal tract, to be completely hydrolyzed into monosaccharides that can be absorbed into the blood stream. Unhydrolyzed oligosaccharides consumed by humans pass into the large intestine where they are fermented by anaerobic microorganisms producing gases such as $CO_2$, $H_2$, and $CH_4$ that lead to flatulence.

Currently, the soy whey is treated as waste, resulting in significant disposal costs. A process for treating soy whey, and other biological or plant processing waste products, to recover the isoflavones and to remove the undesired oligosaccharides, to give a solution of digestible sugars for use in food products, would therefore be highly desirable.

Methods for recovering isoflavones from soy whey are known in the art. For example, a process for separating specific isoflavone fractions from soy whey and soy molasses feed streams is described in U.S. Pat. Nos. 6,033,714; 5,792,503; and 5,702,752. In another method, soy molasses (also referred to as soy solubles) is obtained when vacuum distillation removes the ethanol from an aqueous ethanol extract of defatted soy meal. The feed stream is heated to a temperature chosen according to the specific solubility of the desired isoflavone fraction. The stream is then passed through an ultrafiltration membrane, which allows isoflavone molecules below a maximum molecular weight to permeate. The permeate then may be concentrated using a reverse osmosis membrane. The concentrated stream is then put through a resin adsorption process using at least one liquid chromatography column to further separate the fractions.

Amberlite XAD-4 polymeric adsorbent (Rohm and Haas, Philadelphia, Pa.) is described in U.S. Pat. No. 6,033,714 as particularly attractive for use in the chromatography column. XAD-4 has been described as a hydrophobic, crosslinked styrene/divinylbenzene polymer [Kunin, *Polym. Sci. and Eng.*, 17(1), 58-62 (1977)]. XAD-4 has good stability and its characteristic pore size distribution makes it suitable for adsorption of organic substances of relatively low molecular weight. As disclosed in U.S. Pat. No. 6,033,714, however, other adsorptive resins may be used in the chromatography column.

In another method, U.S. Pat. No. 6,261,565 describes a composition, enriched in isoflavones, that is obtained by fractionating a plant source high in isoflavones, including soy molasses and soy whey. In that process, the aqueous solution containing the isoflavones is passed through an ultrafiltration membrane and then fed through a resin column to isolate the isoflavones.

In all these disclosures, a polymeric adsorbent is used to recover the isoflavones from an aqueous mixture. However, in order to recover the low level of isoflavones in plant processing waste products, such as soy whey, more effectively, an adsorbent with a higher affinity for isoflavones is required.

Methods for the removal of oligosaccharides from soybean wastes are also known in the art. For example, Matsubara et al [*Biosci. Biotech. Biochem.* 60:421 (1996)] describe a method for recovering soybean oligosaccharides from steamed soybean wastewater using reverse osmosis and nanofiltration membranes. JP 07-082,287 teaches the recovery of oligosaccharides from soybean oligosaccharide syrup using solvent extraction. That method comprises adding an organic solvent to the aqueous solution containing the oligosaccharides, heating the mixture to give a homogeneous solution, cooling the solution to form two liquid layers, and separating and recovering the bottom layer. However, these methods are not selective for the removal of the undesired oligosaccharides raffinose and stachyose, which are recovered along with the desirable sugars, sucrose, glucose, and fructose.

A method for recovering isoflavones and separating oligosaccharides from bean curd waste solution is described in KR 2000/055,133. In that method, the waste solution is passed through a polymeric resin column to remove saponin and isoflavones. Then, the waste solution that passed through the column is filtered and concentrated to recover the oligosaccharides. However, the undesirable oligosaccharides raffinose and stachyose are recovered along with the desirable sugars, sucrose, glucose, and fructose. There have been no reports in the art of a process for recovering isoflavones and selectively removing the undesired oligosaccharides raffinose and stachyose from plant processing wastes.

Zeolites are high capacity, selective adsorbents that have been widely used for separating a variety of chemical compounds. Zeolites can be generically described as complex aluminosilicates characterized by three-dimensional framework structures enclosing cavities occupied by ions and water molecules, all of which can move with significant freedom within the zeolite matrix (Meier et al, Atlas of Zeolite Structure Types, Elsevier, 2001). In commercially useful zeolites, the water molecules can be removed from or replaced within the framework structures without destroying the zeolite's geometry.

Zeolites have been widely used as bulk adsorbents and as chromatography supports for separating a variety of substances including gases, hydrocarbons and alcohols. The use of zeolites as selective adsorbents for carbohydrates is well known in the art. For example, the use of zeolites for the separation of monosaccharides is described by Ho et al [*Ind. Eng. Chem. Res.* 26:1407 (1987)], and Sherman et al [*Stud. Surf. Sci. Catal.* 28:1025 (1980)]. Additionally, a process for separating monosaccharides using zeolite adsorbents is described in U.S. Pat. Nos. 4,405,377 and 4,483,980. The adsorption, selectivity of the zeolites to monosaccharides is determined by the extent of interaction with the cations present in the zeolite, as well as the geometric constraints imposed by the zeolite pore geometries and cation positions, as discussed by Sherman et al. [*Stud. Surf. Sci. Catal.* 28:1025 (1980)].

Buttersack et al [*J. Phys. Chem.* 97:11861 (1993)] report that the dealumination of Y-zeolites enhance their affinity to mono-, di-, and trisaccharides by hydrophobic interactions. The adsorption of oligosaccharides such as raffinose and stachyose by a hydrophobic zeolite, specifically dealuminated FAU type zeolite (Si/Al=110), is described by Buttersack et al [*Langmuir* 12:3101 (1996)]. The FAU type zeolite used in that investigation was sold by Degussa Company, South Plainfield, N.J., under the product name Wessalith® DAY-55. That disclosure reports that DAY-55 has a very strong affinity for stachyose, a strong affinity for raffinose and sucrose, and very little affinity for glucose when tested in a single component system. The adsorption characteristics of DAY-55 were not tested in a multi-component system consisting of a mixture of sugars.

A need remains for a simple, economical process to recover isoflavones and remove undesirable oligosaccharides such as raffinose and stachyose from aqueous mixtures such as soy whey and other plant processing waste products. Such a process would yield several useful products including isoflavones, and a solution containing digestible sugars, such as glucose, fructose, and sucrose.

SUMMARY OF THE INVENTION

One embodiment of this invention is a method for selectively recovering isoflavones and removing oligosaccharides from an aqueous mixture by:

(a) contacting a large pore, hydrophobic zeolite or molecular sieve with the aqueous mixture;

(b) separating the zeolite or molecular sieve used in step (a) from the aqueous mixture;

(c) contacting the zeolite or molecular sieve separated in step (b) with an organic solvent to release adsorbed isoflavones;

(d) contacting the aqueous mixture remaining after step (b) with an ultrastabilized, hydrophobic zeolite Y having a Si/Al ratio of about 10 to about 45;

(e) separating the zeolite used in step (d) from the aqueous mixture; and (f) recovering the aqueous mixture remaining after step (e).

Another embodiment of this invention is a method of using a zeolite or a molecular sieve for selectively recovering isoflavones and removing oligosaccharides from an aqueous mixture by:

(a) contacting a large pore, hydrophobic zeolite or molecular sieve with the aqueous mixture;

(b) separating the zeolite or molecular sieve used in step (a) from the aqueous mixture;

(c) contacting the zeolite or molecular sieve separated in step (b) with an organic solvent to release adsorbed isoflavones;

(d) contacting the aqueous mixture remaining after step (b) with an ultrastabilized, hydrophobic zeolite Y having a Si/Al ratio of about 10 to about 45;

(e) separating the zeolite used in step (d) from the aqueous mixture; and (f) recovering the aqueous mixture remaining after step (e).

A further embodiment of this invention is a method for selectively recovering isoflavones and removing oligosaccharides from an aqueous mixture by:

(a) contacting an ultrastabilized, hydrophobic zeolite Y having a Si/Al ratio of about 10 to about 45 with the aqueous mixture;

(b) separating the zeolite used in step (a) from the aqueous mixture;

(c) contacting the aqueous mixture remaining after step (b) with a large pore, hydrophobic zeolite or molecular sieve;

(d) separating the zeolite or molecular sieve used in step (c) from the aqueous mixture;

(e) recovering the aqueous mixture remaining after step (d); and (f) contacting the large pore, hydrophobic zeolite or molecular sieve used in step (c) with an organic solvent to release adsorbed isoflavones.

Yet another embodiment of this invention is a method of using a zeolite or molecular sieve for selectively recovering isoflavones and removing oligosaccharides from an aqueous mixture by:

(a) contacting an ultrastabilized, hydrophobic zeolite Y having a Si/Al ratio of about 10 to about 45 with the aqueous mixture;

(b) separating the zeolite used in step (a) from the aqueous mixture;

(c) contacting the aqueous mixture remaining after step (b) with a large pore, hydrophobic zeolite or molecular sieve;

(d) separating the zeolite or molecular sieve used in step (c) from the aqueous mixture;

(e) recovering the aqueous mixture remaining after step (d); and (f) contacting the large pore, hydrophobic zeolite or molecular sieve used in step (c) with an organic solvent to release adsorbed isoflavones.

DETAILED DESCRIPTION OF THE INVENTION

Figure 1:
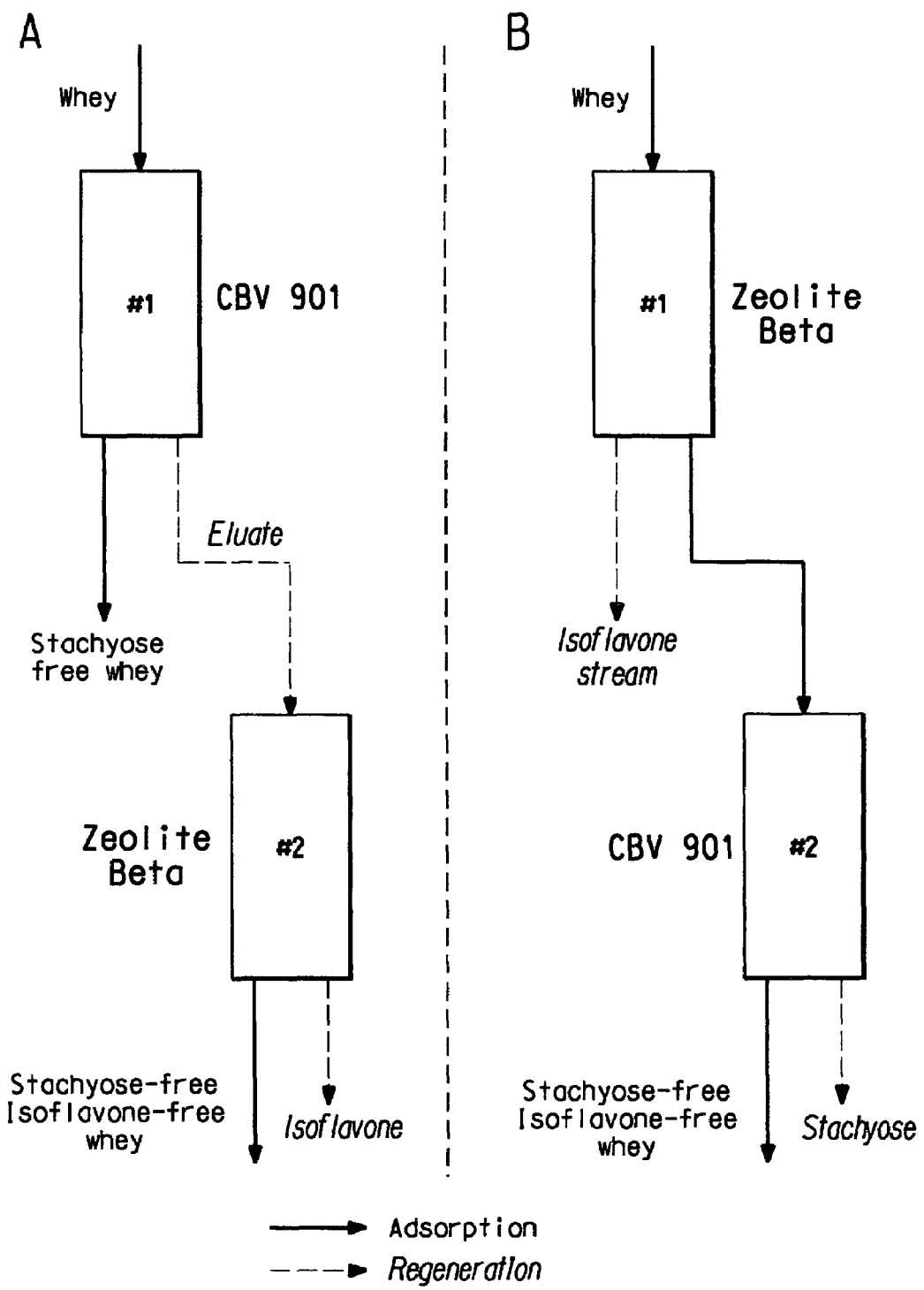
FIG. 1 is a schematic diagram of processes that use zeolites as adsorbents to treat dilute soy whey.

The process disclosed herein selectively recovers isoflavones and removes undesired oligosaccharides from aqueous mixtures using zeolites. The process involves contacting an aqueous mixture containing the isoflavones and oligosaccharides with a large pore, hydrophobic zeolite adsorbent such as zeolite Beta to remove isoflavones. The isoflavones are recovered from the zeolite by treatment with an organic solvent such as ethanol. The treated aqueous mixture is then contacted with an ultrastabilized, hydrophobic zeolite Y to remove undesired oligosaccharides. The resulting solution, containing the digestible sugars glucose, sucrose, and fructose, can be used in food products.

In another embodiment, the aqueous mixture containing isoflavones and oligosaccharides is first treated with an ultrastabilized hydrophobic zeolite Y to remove undesired oligosaccharides. The treated aqueous mixture is then contacted with a large pore, hydrophobic zeolite, such as zeolite Beta, to remove isoflavones, which are subsequently recovered by treating the zeolite with an organic solvent such as ethanol. The treated aqueous mixture, containing the digestible sugars glucose, sucrose, and fructose, can be used in food products.

Abbreviations as used in various places in this disclosure are defined as follows:

AFI refers to the zeolite structure type $AlPO_4$-5.
BEA refers to zeolite Beta.
C is equilibrium isoflavone concentration in units of mg/L.
CHA refers to the zeolite structure type Chabazite.
ERI refers to the zeolite structure type Erionite.
EtOAc is ethyl acetate.
FAU refers to the zeolite faujasite.
FER refers to the zeolite structure type Ferrierite.
GIS refers to the zeolite structure type Gismondine.
h is hour or hours.
HPLC refers to the separation and analysis technique, high performance liquid chromatography.
IC is ion chromatography.
K and n are empirical constants calculated from fitting the adsorption data to the Power Law equation.
KDa means kilodaltons.
KFI refers to the zeolite structure type ZK-5.
LTA refers to the zeolite structure type Linde Type A.
LTL refers to the zeolite structure type Linde Type L.
MEHQ is p-methoxyphenol.
mM is a unit of concentration meaning millimoles per liter.
MEL refers to the zeolite structure type ZSM-11.
MFI refers to the zeolite structure type ZSM-5.
MOR refers to the zeolite mordenite.
nm is nanometers.
ppm is a unit of concentration meaning parts per million.
PS-DVB refers to a poly(styrene-co-divinylbenzene) adsorbent. MW is molecular weight.
q is the loading of isoflavone on the adsorbent in mg/g of dry adsorbent.
Qmax and B are empirical constants calculated from fitting the adsorption data to a Langmuir adsorption isotherm.
R is the correlation coefficient of a linear regression fit of the data.
rpm is revolutions per minute.
RHO refers to the zeolite structure type Rho.
SPA refers to a specially synthesized polymeric adsorbent prepared by suspension polymerization of methacrylic acid, styrene, and ethylene glycol dimethacrylate.
TC refers to a thermocouple used to monitor temperature.
TON refers to the zeolite structure type Theta-1.
XAD-4 refers to a commercial, polymeric resin, Amberlite®, a hydrophobic, cross-linked styrene/divinyl benzene polymer.

The process of this invention is applied to an aqueous mixture that contains isoflavones including, but not limited to, plant processing waste products. Plant processing waste products are herein defined as any waste product resulting from the processing of plant material, especially wastes from leguminous plants such as soy beans, peanuts and many bean species, including mung beans, pigeon peas and chick peas. These plant processing wastes contain isoflavones and a mixture of sugars including monosaccharides, disaccharides, and higher oligosaccharides. The aqueous mixture may be in the form of a homogeneous solution, a heterogeneous suspension, or an emulsion.

The term "monosaccharide" will herein refer to simple sugars composed of one sugar unit, for example, glucose and fructose. "Disaccharide" will refer to a sugar consisting of two sugar units, for example sucrose. "Oligosaccharide" will refer to sugars consisting of between 2 and 10 sugar units. Raffinose is a trisaccharide consisting of fructose, glucose and galactose units. Stachyose is a tetrasaccharide consisting of fructose, glucose, and two galactose units. The term "isoflavones" will herein refer to a class of crystalline ketones found in leguminous plants and that are believed to have numerous health benefits. These include, but are not limited to, the soy isoflavones: genistein, genistin, 6"-O-malonylgenistin, 6"-O-acetylgenistin, daidzein, daidzin, 6"-O-malonyldaidzin, 6"-O-acetyldaidzin, glycitein, glycitin, 6"-O-malonylglycitin, and 6"-O-acetylglycitin.

One particularly suitable starting material for this invention is soy whey. Soy whey is a by-product of soybean processing, which is reviewed in *Soybeans—Chemistry, Technol-*

*ogy, and Utilization*, by KeShun Liu (Chapman & Hall, New York, 1997). The processing of soybeans may be done in many well-known ways. For example, soy protein isolates are typically prepared from defatted soy meal. Proteins and soluble carbohydrates are extracted into aqueous solution (pH 7-10). The insoluble residue is mostly fiber and is removed by centrifugation. The protein is precipitated from solution as curd at its isoelectric point (about pH 4.5). The liquid remaining after the protein has been isolated is referred to as the soy whey, which is typically treated as waste. The whey contains isoflavones at the parts per million (ppm) level, as well as soluble carbohydrates. It is desirable to selectively recover the isoflavones and to remove from the mixture the undesired oligosaccharides raffinose and stachyose, which are not readily digested in the human gastrointestinal tract.

In one embodiment of the instant invention, the aqueous mixture is treated to remove any particulate material by means including, but not limited to, ultra-filtration or centrifugation. For example, the aqueous mixture is ultra-filtered through a 10 KDa hollow fiber module. The filtrate is then contacted with a calcined, large pore, hydrophobic zeolite adsorbent in the form of a batch reactor, a fluidized bed reactor or a packed column to remove isoflavones. Preferably, a packed column is used. These separation methods have previously been used for other purposes. For example, the use of batch reactors and fluidized bed reactors are described in U.S. Pat. No. 4,483,980; and the use of adsorption resins in a packed column is described in U.S. Pat. No. 6,033,714, each of these patents being incorporated in its entirety as a part hereof for all purposes.

Methods for calcining zeolites are described, for example, in Shannon et al, *J. Catal.* 113:367-382 (1988). An example of one method of calcining is to heat the zeolite in air at a rate of 1° C./minute to 400° C., holding for 10 minutes at 400° C., heating to 450° C. at a rate of 1° C./minute, holding for 10 minutes at 450° C., heating to 500° C. at a rate of 1° C./minute, holding at 500° C. for 5 hours, and then cooling to 110° C.

Zeolites can be generally represented by the following formula: $M_{2/n}O.Al_2O_3.xSiO_2.yH_2O$; wherein M is a cation of valence n, x is greater than or equal to 2, and y is a number determined by the porosity and the hydration state of the zeolite, generally from about 2 to about 8. In naturally occurring zeolites, M is principally represented by Na, Ca, K, Mg and Ba in proportions usually reflecting their approximate geochemical abundance. The cations M are loosely bound to the structure and can frequently be completely or partially replaced with other cations by conventional ion exchange.

The zeolite framework structure has corner-linked tetrahedra with Al or Si atoms at centers of the tetrahedra and oxygen atoms at the corners. Such tetrahedra are combined in a well-defined repeating structure comprising various combinations of 4-, 6-, 8-, 10-, and 12-membered rings. The resulting framework structure is a pore network of regular channels and cages that is useful for separation. Pore dimensions are determined by the geometry of the aluminosilicate tetrahedra forming the zeolite channels or cages, with nominal openings of about 0.26 nm for 6-member rings, about 0.40 nm for 8-member rings, about 0.55 nm for 10-member rings and about 0.74 nm for 12-member rings (these numbers assume ionic radii for oxygen). Zeolites with the largest pores, being the 8-member rings, 10-member rings, and 12-member rings, are considered small, medium, and large pore zeolites, respectively. Pore dimensions are critical to the performance of these materials in catalytic and separation applications since this characteristic determines whether molecules of a certain size can enter and exit the zeolite framework. In practice, it has been observed that very slight decreases in ring dimensions can effectively hinder or block movement of particular molecular species through the zeolite structure.

The effective pore dimensions that control access to the interior of the zeolites are determined not only by the geometric dimensions of the tetrahedra forming the pore opening, but also by the presence or absence of ions in or near the pore. For example, in the case of zeolite type A, access can be restricted by monovalent ions such as Na+ or $K^+$ that may be situated in or near the openings of a 6-member or 8-member ring. Conversely, access can be enhanced by divalent ions, such as $Ca^{2+}$, that may be situated in or near 6-member ring openings. Thus, the potassium and sodium salts of zeolite A exhibit effective pore openings of about 0.3 nm and about 0.4 nm, respectively, whereas the calcium salt of zeolite A has an effective pore opening of about 0.5 nm. The presence or absence of ions in or near the pores, channels and/or cages can also significantly modify the accessible pore volume of the zeolite for sorbing materials.

Representative examples of zeolites are small pore zeolites such as NaA (LTA), CaA (LTA), Erionite (ERI), Rho (RHO), ZK-5 (KFI) and chabazite (CHA); medium pore zeolites such as ZSM-5 (MFI), ZSM-11 (MEL), ZSM-22 (TON), and ZSM48; and large pore zeolites such as zeolite Beta (BEA), faujasite (FAU), mordenite (MOR), zeolite L (LTL), NaX (FAU), NaY (FAU), DA-Y (FAU) and CaY (FAU). The letters in parentheses give the framework structure type of the zeolite.

Typical examples of zeolites that are useful in this invention for recovering isoflavones are large pore, hydrophobic zeolites, including, but not limited to, faujasites and Beta zeolites, having a high silicon to aluminum ratio. A preferred zeolite adsorbent is zeolite Beta. Large pore zeolites have a framework structure consisting of 12 membered rings with a pore size of about 0.65 to about 0.75 nm. Hydrophobic zeolites generally have Si/Al ratios greater than or equal to about 5, and the hydrophobicity generally increases with increasing Si/Al ratios. Suitable zeolites have a Si/Al ratio of at least about 25.

Zeolites with a high Si/Al ratio can be prepared synthetically or by modification of high alumina-containing zeolites using known methods. These methods include, but are not limited to, treatment with $SiCl_4$ or $(NH_4)_2SiF_6$ to replace AL with Si, as well as steaming followed by acid treatment. A $SiCl_4$ treatment is described by Blatter et al. [*J. Chem. Ed.* 67: 519 (1990)]. An $(NH_4)_2SiF_6$ treatment is described in U.S. Pat. No. 4,503,023. A thermal treatment with steam, followed by an acid treatment, is described in U.S. Pat. No. 3,506,400. Zeolites prepared using this thermal treatment are herein referred to as "ultrastabilized zeolites". All of these treatments are generally very effective at increasing the Si/Al ratio for zeolites such as zeolites Y and mordenite. In addition, WO 00/51940 describes a method for preparing a more hydrophobic, ultrastabilized zeolite with a high Si/Al ratio by thermal treatment comprising calcining zeolite Y in steam under turbulent conditions with respect to the flow pattern of the zeolite at a temperature between 650-1000° C.

The presence of aluminum atoms in the framework of a zeolite results in hydrophilic sites. On removal of these framework aluminum atoms, water adsorption is seen to decrease and the material becomes more hydrophobic and generally more organophilic. See, for example, the discussion of hydrophobicity in zeolites by Chen [*J. Phys. Chem.* 80:60 (1976)]. It is also possible to make any zeolite hydrophobic by treating it with a hydrophobic reagent such as an organosilane.

Additionally, certain types of molecular sieves, of which zeolites are a sub-type, may be used as the adsorbent of the present invention. Molecular sieves are well known in the art and are described by Szostak [*Molecular Sieves Principles of Synthesis and Identification*, Van Nostrand Reinhold, N.Y. (1989)]. While zeolites are aluminosilicates, molecular sieves contain other elements in place of aluminum and silicon, but have analogous structures. Large pore, hydrophobic molecular sieves that have similar properties to the preferred zeolites described above are preferred. Examples include, but are not limited to, Ti-Beta, B-Beta, and Ga-Beta silicates.

A preferred zeolite for use in this invention for recovering isoflavones, zeolite Beta, has a significantly higher affinity for isoflavones than the conventional poly(styrene-co-divinylbenzene) (PS-DVB) adsorbent and the specifically synthesized polymeric adsorbent prepared by suspension polymerization of methacrylic acid, styrene, and ethylene glycol dimethacrylate. Moreover, zeolite Beta is found to have essentially no adsorption of oligosaccharides, including the undesired oligosaccharides raffinose and stachyose.

Following the contacting of the aqueous mixture with a zeolite such as a large pore, hydrophobic zeolite to remove isoflavones, the zeolite is separated from the aqueous mixture. When the zeolite is used in a batch reactor, this separation can be accomplished by means that include, but are not limited to, filtration or centrifugation. When the zeolite adsorbent is used in a column, the separation occurs by passing the aqueous mixture through the column. The treated aqueous mixture is collected and saved for further processing. Then, the zeolite adsorbent may be washed with water to remove non-adsorbed, soluble components. This step is optional, but is preferred to obtain the highest level of purity of the isoflavones. Separation of the zeolite adsorbent from the wash solution is accomplished as described above. Next, the isoflavones are released by contacting the zeolite with a suitable organic solvent. Suitable organic solvents include, but are not limited to, alcohols such as ethanol, methanol, and isopropanol. A preferred organic solvent is anhydrous ethanol. The isoflavones are recovered by evaporating the solvent after separation from the zeolite, as described above. Optionally, the zeolite can be regenerated for reuse by repeating the calcination process. However, regeneration of the zeolite by calcination is not required for reuse.

Methods and materials for use in recovering isoflavones from aqueous mixtures are also set forth in the application having Docket No. CL-1880, which is assigned to E.I. du Pont de Nemours and Company and was filed on the same day as this application, and which is incorporated in its entirety as a part hereof for all purposes.

Suitable zeolites for use in the present invention for removing undesired oligosaccharides include ultrastabilized hydrophobic zeolite Y. Ultrastabilized zeolites, as used herein, refers to zeolites such as those that are treated using the thermal treatments described above to make them more hydrophobic. Y zeolites are large pore zeolites, having the faujasite framework structure. Without wishing to be bound by any theory, hydrophobic zeolite Y stabilized by thermal treatment may have a higher affinity for the oligosaccharides raffinose and stachyose in mixtures containing other sugars than hydrophobic zeolites prepared by treatment with $SiCl_4$ or $(NH_4)_2SiF_6$ such as zeolite Wessalith® DAY-55, because the thermal treatment of zeolites may result in the substantial removal of cations such as $H^+$ and $NH_4^+$ from their normal association with the $AlO_4^-$ tetrahedra. This creates an electrovalent imbalance in the zeolite structure [as noted, for example, in U.S. Pat. No. 4,503,023; and Szostak in *Introduction to Zeolite Science and Practice* (Bekkum et al eds) Studies in Surface Science and Catalysis, Vol 58, Elsevier, N.Y., 1991, Chapter 5], and this imbalance must be accompanied by structural rearrangement in the zeolite to restore the electrovalent balance, resulting in significantly different properties. Zeolites that are treated with $SiCl_4$ or $(NH_4)_2SiF_6$ such as zeolite Wessalith® DAY-55, to make them more hydrophobic do not appear to undergo the structural changes that are typically caused by thermal treatments, and the resulting structural difference may explain the different behavior of the different hydrophobic zeolites with respect to oligosaccharide adsorption.

A particularly suitable zeolite for use in the present invention for oligosaccharide removal is thus an ultrastabilized, hydrophobic zeolite Y having a Si/Al ratio of about 10 to about 45. The ultrastabilized, hydrophobic zeolite Y may be prepared by the process of thermal treatment with steam followed by acid treatment, as described in U.S. Pat. No. 3,506,40, which is incorporated in its entirety as a part hereof for all purposes. The starting material for this procedure may be zeolite NaY [available commercially from various sources such as Alfa (Milwaukee, Wis.)] that is either ammonium- or hydrogen-exchanged. Alternatively, the ultrastabilized, hydrophobic zeolite Y may be prepared by the thermal method described in WO 00/51940, which is incorporated in its entirety as a part hereof for all purposes. In that procedure the ultrastabilized, hydrophobic zeolite Y is prepared by calcining zeolite Y with steam under turbulent conditions with respect to flow pattern of the zeolite. Turbulent conditions refer to a condition where a gas flows through a dispersed solid phase without a discernable interface. Examples of ultrastabilized, hydrophobic Y zeolites suitable for use in the present invention that are available commercially include but are not limited to zeolite CBV-901 (available from Zeolyst, Valley Forge, Pa.) and HiSiv™ 4000 (available from UOP, Des Plaines, Ill.).

The treated aqueous mixture, after removal of isoflavones, is then contacted with an ultrastabilized hydrophobic zeolite Y, such as CBV-901 or HiSiv™ 4000, in the form of a batch reactor, a fluidized bed reactor or a packed column, as described above. Preferably, a packed column is used.

Following contacting of the aqueous mixture with the zeolite adsorbent to remove oligosaccharides, the adsorbent is separated from the aqueous mixture. When the zeolite is used in a batch reactor, this separation can be accomplished by means that include, but are not limited to, filtration or centrifugation. When the zeolite is used in a column, the separation occurs by passing the aqueous mixture through the column. The treated aqueous mixture, containing digestible sugars, is recovered and may be used in food products. The adsorbed oligosaccharides may be recovered by treating the zeolite with a suitable solvent to elute them. Suitable solvents include, but are not limited to alcohols such as methanol and ethanol.

After recovery, the oligosaccharides may be treated with an enzyme such as α-galactosidase to hydrolyze them into simple sugars, which may also be used in food products. Alternatively, the adsorbed oligosaccharides may be burned off the zeolite so that the zeolite can be reused. For example, the zeolite may be calcined at 550 to 650° C. in air or oxygen to burn off the oligosaccharides. The zeolite is then ready for reuse.

Methods and materials for use in removing undesirable oligosaccharides such as raffinose and stachyose from aqueous mixtures are also set forth in the application having Docket No. CL-2081, which is assigned to E.I. du Pont de Nemours and Company and was filed on the same day as this application, and which is incorporated in its entirety as a part hereof for all purposes.

In the embodiment described above, the aqueous mixture is first treated to remove isoflavones, which is then followed by treatment to remove undesired oligosaccharides. It appears that the degree of adsorption of oligosaccharides by a zeolite, such as the ultrastabilized, hydrophobic Y, is greater after the removal of isoflavones. While not wishing to be bound by any theory, this result suggests that there is a competition between isoflavones and oligosaccharides for the binding sites on a zeolite such as CBV-901. One preferred embodiment using zeolite Beta and zeolite CBV-901 in the form of packed columns is illustrated in FIG. 1B.

In another embodiment of the instant invention, the aqueous mixture is treated to remove any particulate material by means including, but not limited to, ultra-filtration and centrifugation, as described above. The filtrate is then contacted with an ultrastabilized, hydrophobic zeolite Y, such as CBV-901 or HiSiv™ 4000, in the form of a batch reactor, a fluidized bed reactor or a packed column to remove the undesired oligosaccharides raffinose and stachyose, as described above. Preferably, a packed column is used. Following contacting of the aqueous mixture with the zeolite adsorbent, the adsorbent is separated from the aqueous mixture, as described above. The oligosaccharides may be recovered from the zeolite and treated enzymatically to produce simple sugars, as described above.

The treated aqueous mixture with undesired oligosaccharides removed is then contacted with a calcined, large pore, hydrophobic zeolite adsorbent in the form of a batch reactor, a fluidized bed reactor or a packed column to remove isoflavones. Preferably, zeolite Beta is used in the form of a packed column for this purpose. Following contacting of the aqueous mixture with the zeolite adsorbent, the adsorbent is separated from the aqueous mixture, as described above. The treated aqueous mixture, containing the digestible sugars glucose, sucrose, and fructose, is collected and may be used in food products. The zeolite adsorbent may then be washed with water to remove non-adsorbed, soluble components. This step is optional, but is preferred to obtain the highest level of purity of the isoflavones. Separation of the zeolite adsorbent from the wash solution is accomplished as described above. Next, the isoflavones are released by contacting the zeolite with a suitable organic solvent. Suitable organic solvents include, but are not limited to, alcohols such as ethanol, methanol, and isopropanol. The preferred organic solvent is anhydrous ethanol. The isoflavones are recovered by evaporating the solvent after separation from the zeolite, as described above. Optionally, the zeolite can then be regenerated for reuse by repeating the calcination process. However, regeneration of the zeolite by calcination is not required for reuse. This alternative embodiment using zeolite CBV-901 and zeolite Beta in the form of packed columns is illustrated in FIG. 1A.

In another embodiment of this invention, two different types of zeolites (for example a large pore, hydrophobic zeolite such as zeolite Beta for isoflavone recovery, and an ultrastabilized, hydrophobic zeolite Y, such as zeolite CBV-901 or HiSiv™ 4000, for oligosaccharide removal) may be used in a single, mixed adsorbent column. The ratio of the two adsorbents in the column may be varied to provide the optimum recovery. In this embodiment, the aqueous mixture is treated to remove any particulate material by means including, but not limited to, ultra-filtration and centrifugation, as described above and then passed through the mixed adsorbent column. Both the isoflavones and the undesired oligosaccharides are removed from the aqueous mixture simultaneously by the zeolite adsorbents. The column eluant therefore contains the desirable sugars glucose, sucrose and fructose, which may be used in food products. The column is then treated with an organic solvent such as ethanol to recover the isoflavones. The isoflavones should be recovered without releasing the undesired oligosaccharides. Optionally, after recovery of the isoflavones, the column may be further treated to recover the undesired oligosaccharides raffinose and stachyose, which can be converted by enzymatic means to simple sugars as described above.

The present invention is further defined in the following examples. These examples, while indicating the preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various uses and conditions.

EXAMPLES

General Methods:

Soy Whey Sample Preparation:

Soy whey samples were obtained from DuPont Protein Technologies (St. Louis, Mo.) in the form of soy molasses, consisting of 55% solids. The soy molasses was diluted by mixing one part molasses with 9 parts of deionized water and this mixture was allowed to equilibrate for 90 min. The mixture was then centrifuged at 9000 rpm for 30 min at room temperature. The supernatant from the centrifugation step was used as the soy whey concentrate. The soy whey concentrate was ultra-filtered through a 10 kDA hollow fiber module (UFP-10-E-4A, obtained from A/G Technology Corporation, Needham, Mass.) in batch mode. The soy whey concentrate was pumped and recirculated through the lumen of the hollow fibers in the cartridge using a Masterflex® pump (Cole-Parmer Instruments, Vernon Hills, Ill.). The flow rate of the soy whey concentrate varied from 1 to 5 mL/min. The soy whey permeate from the filter module was collected and either used immediately or was refrigerated for future use. Alternatively, the collected, soy whey permeate was frozen in small batches for future use. Typically, 400-600 mL of soy whey permeate was collected from the ultra-filtration process over a 4 h interval from 1 L of initial soy whey concentrate. The soy whey permeate was diluted 1:1 with deionized water to generate a sample of soy whey, similar in composition to the expected discharge from the curd washing step.

Quantitation of Isoflavones using HPLC:

Isoflavones were resolved and quantified at 260 nm using HPLC on a 2.1 mm×100 mm Hypersil ODS column (3 micron stationary phase), obtained from Agilent Technologies, Wilmington, Del. Mobile phase A (88:10:2) of water:methanol:glacial acetic acid and Mobile phase B consisted of 98:2 methanol:glacial acetic acid. A flow rate of 0.2 ml/min was used with a gradient varying from 95% A at t=0 min, 30% A at t=1 min, 0% A at t=16 min, and 95% A at t=19.5 min and remaining time till the end of the 27.5 minute run. Other details of the HPLC procedure are familiar to those skilled in the art. The difference in isoflavone concentration in the soy whey before and after the experiment was used to estimate the weight of isoflavones adsorbed on the samples. Any negative values in the results presented in the following tables should be interpreted as being equal to zero within the experimental error of the measurement.

Isoflavone Adsorption Measurements:

For isoflavone adsorption from soy whey, the adsorption data was converted to an aglycone basis as follows: aglycone mass adsorbed=mass of daidzein adsorbed+mass of glycitein adsorbed+mass of genistein adsorbed+mass of daidzin adsorbed×(MW daidzein/MW daidzin)+mass of glycitin adsorbed×(MW glycitein/MW glycitin)+mass of genistin adsorbed×(MW genistein/MW genistin). The isoflavone loading (mass isoflavone/mass adsorbent) was calculated by taking the concentration difference times the solution volume and dividing by the mass of dry zeolite used in the experiment. The adsorption isotherms for the uptake of isoflavones from soy whey on the zeolite samples at room temperature were obtained by plotting the isoflavone loading (mg/g of zeolite) versus the equilibrium concentration of the isoflavones, in mg/L.

Quantitation of Sugars using Ion Chromatography (IC):

Sugar concentrations were determined using a Dionex DX500 IC equipped with a CarboPac PA10 column (Dionex Corp., Sunnyvale, Calif.). The chromatography was carried out at 35° C. using a mobile phase consisting of NaOH (27% of a 200 mM solution) and deionized water (73%) at a flow rate of 1 mL/min. The sugars glucose, sucrose, fructose, raffinose and stachyose were detected using an ED Amperometer. The sugars were identified and quantified by comparison to authentic standards. Any negative values in the results presented in the following tables should be interpreted as being equal to zero within the experimental error of the measurement.

Example 1

Preferential Binding of Isoflavones on Specific Zeolites

The purpose of this example was to screen a variety of zeolites for the adsorption of isoflavones.

Zeolite Sample Preparation:

Samples # 1-12

The zeolite samples listed in Table 1 were calcined in air by heating 1° C./minute to 400° C., holding for 10 minutes at 400° C., heating 1° C./minute to 450° C., holding for 10 minutes at 450° C., heating 1° C./minute to 500° C., holding 5 hours at 500° C., and then cooling to 110° C. The samples were transferred rapidly to dry jars, which were then closed and sealed.

TABLE 1

List of zeolite samples used and their source.

| Sample | Vendor | Product Name | Zeolite (Calcined) | Si/Al | Form | Lot Number |
|---|---|---|---|---|---|---|
| 1 | Zeolyst[1] | CBV-901 | H-SDUSY | 40 | Powder | 1822-66 |
| 2 | Zeolyst | ZD2K014 | H-SDUSY | 40 | Extrudates | 001-124 |
| 3 | Zeolyst | CBV-90A | H-Mordenite | 45 | Powder | 1822-60-30 |
| 4 | Zeolyst | ZD 96065 | H-Mordenite | 15 | Powder | 1822-41 |
| 5 | Zeolyst | CP 811C-300 | H-Beta | 150 | Powder | 1822-85 |
| 6 | Zeolyst | CP 811E-150 | H-Beta | 75 | Powder | 1822-75 |
| 7 | Degussa[2] | DAY-55 | DA-Y | 55 | Powder | TC133 |
| 8 | UOP[3] | HI-SIV 4000 | Unknown | Unknown | Powder | 976594061003 |
| 9 | Alfa[4] | LZ-Y52 | Na—Y | 2.5 | Powder | 030784 |
| 10 | Aldrich[5] | 13X | Na—X | 1.25 | Powder | 01820CY |
| 11 | Union Carbide[6] | S-115 | Silicalite | 90-200 | Powder | 11736-19 |
| 12 | Union Carbide | AlPO$_4$-5 | AlPO$_4$-5 | — | Powder | 13551-91-25C |

[1]Valley Forge, PA
[2]South Plainfield, NJ
[3]Des Plaines, IL
[4]Ward Hill, MA
[5]Milwaukee, WI
[6]New York, NY Batch Experiments:

A known mass of the dry zeolite sample (typically 0.2-5 g) was contacted with a known volume of soy whey (typically 2.5-50 mL). Samples were placed on a laboratory rotary shaker (typically set at 200 rpm) and shaken at room temperature for 4-24 h. A portion of the supernatant (typically 1 mL) was withdrawn, filtered, and assayed for isoflavones by high performance liquid chromatography (HPLC) analysis as described above.

Figure 2:
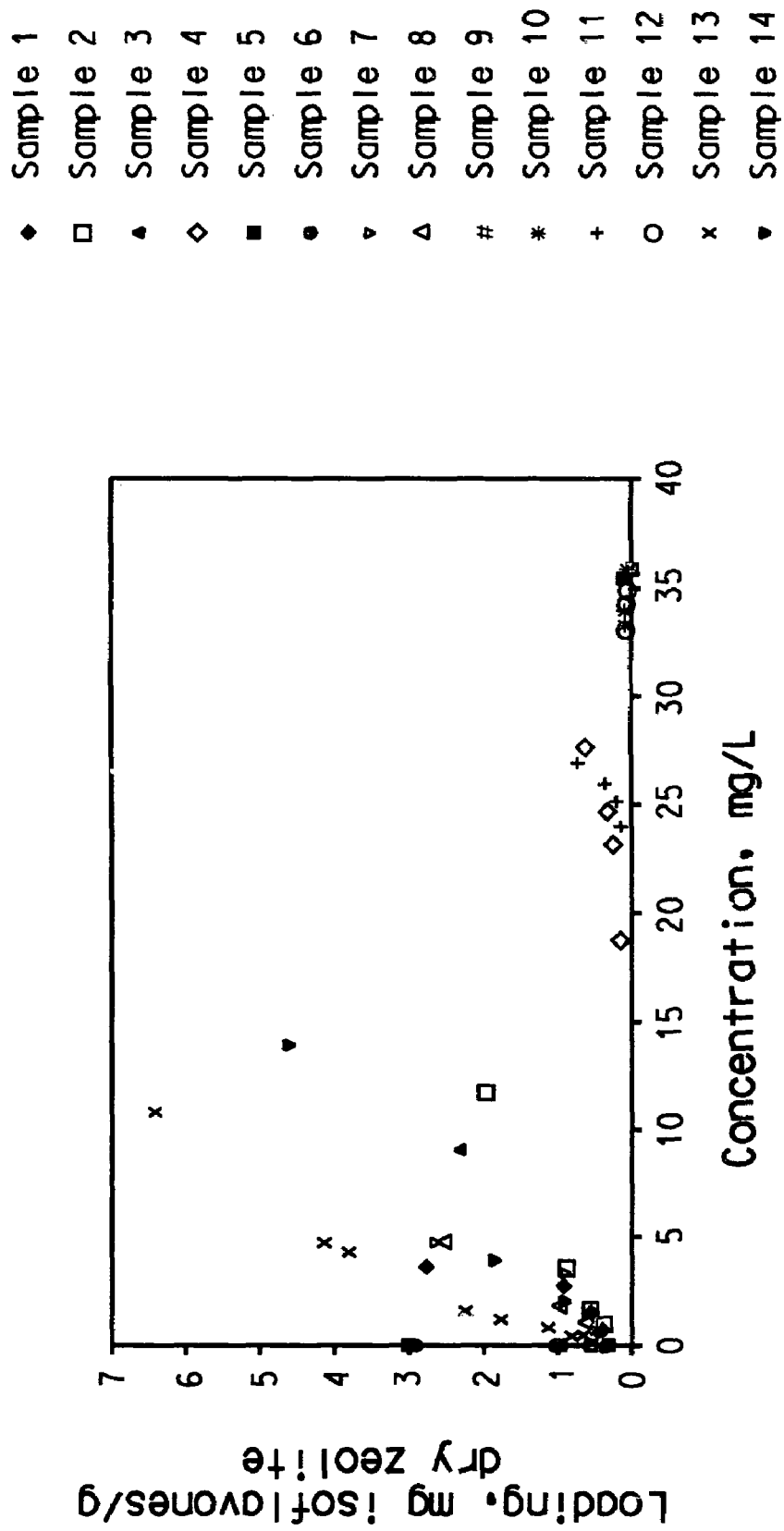
FIG. 2 shows the adsorption isotherms for the adsorption of isoflavones from soy whey onto various zeolites and organic polymer adsorbents. The x-axis is the equilibrium concentration of the isoflavones in solution in mg/L. The y-axis is the amount of isoflavones adsorbed onto the adsorbents in mg/g dry weight of adsorbent.

Isoflavone Adsorption Results:

FIG. 2 shows the adsorption isotherms for the zeolites listed in Table 1. The raw data for this graph is given in Table 2. The value for the constants K and n for each sample was estimated from a linear regression fit to the standard Power law equation for an adsorption isotherm, i.e., $q=KC^n$, where q is the isoflavone loading on the zeolite, and C is the equilibrium isoflavone concentration. R in the table refers to the correlation coefficient for the regression fit. The resulting values are given in Table 3.

TABLE 2

Raw Data for the Adsorption of Isoflavones onto Various Zeolites.

| Sample ID | Sample | Concentration, mg/L | Loading, mg/g |
|---|---|---|---|
| 1 | CBV-901 | 3.86 | 2.72 |
|   |   | 2.41 | 0.98 |

TABLE 2-continued

Raw Data for the Adsorption of Isoflavones onto Various Zeolites.

| Sample ID | Sample | Concentration, mg/L | Loading, mg/g |
|---|---|---|---|
|  |  | 1.50 | 0.53 |
|  |  | 0.79 | 0.27 |
| 2 | ZD2K014 | 11.95 | 1.96 |
|  |  | 3.36 | 0.95 |
|  |  | 1.57 | 0.49 |
|  |  | 0.95 | 0.27 |
| 3 | CBV-90A | 8.81 | 2.31 |
|  |  | 1.48 | 0.99 |
|  |  | 0.56 | 0.55 |
|  |  | 0.27 | 0.28 |
| 4 | ZD96065 | 27.75 | 0.54 |
|  |  | 24.66 | 0.30 |
|  |  | 22.72 | 0.18 |
|  |  | 18.67 | 0.13 |
| 5 | CP-811C-300 | 0.00 | 2.96 |
|  |  | 0.00 | 1.06 |
|  |  | 0.00 | 0.56 |
|  |  | 0.00 | 0.28 |
| 6 | CP811E-150 | 0.00 | 2.89 |
|  |  | 0.00 | 1.09 |
|  |  | 0.00 | 0.55 |
|  |  | 0.00 | 0.29 |
| 7 | DAY-55 | 4.66 | 2.53 |
|  |  | 3.09 | 0.98 |
|  |  | 1.75 | 0.45 |
|  |  | 1.12 | 0.27 |
| 8 | HiSiv ™ 4000 | 4.65 | 2.39 |
|  |  | 1.60 | 1.00 |
|  |  | 0.68 | 0.49 |
|  |  | 0.27 | 0.27 |
| 9 | LZ-Y52 | 35.60 | −0.13 |
|  |  | 35.80 | −0.05 |
|  |  | 34.24 | 0.00 |
|  |  | 35.62 | −0.01 |
| 10 | 13X | 34.00 | 0.01 |
|  |  | 34.64 | −0.02 |
|  |  | 36.02 | −0.03 |
|  |  | 34.14 | 0.00 |
| 11 | S-115 | 26.92 | 0.59 |
|  |  | 25.87 | 0.25 |
|  |  | 25.16 | 0.15 |
|  |  | 24.21 | 0.08 |
| 12 | AlPO$_4$-5 | 34.78 | −0.05 |
|  |  | 35.32 | −0.04 |
|  |  | 34.73 | −0.01 |
|  |  | 33.85 | 0.00 |
| 13 | PS-DVB | 0.44 | 0.88 |
|  |  | 0.48 | 0.73 |
|  |  | 1.11 | 1.16 |
|  |  | 1.24 | 1.72 |
|  |  | 1.65 | 2.26 |
|  |  | 4.36 | 3.74 |
|  |  | 4.77 | 4.16 |
|  |  | 10.95 | 6.47 |
| 14 | SPA | 0.92 | 0.49 |
|  |  | 1.76 | 0.95 |
|  |  | 3.88 | 1.8 |
|  |  | 13.82 | 4.59 |

TABLE 3

Results of fitting data to the Power Law equation.

| SAMPLE ID | SAMPLE | K | n | $R^2$ |
|---|---|---|---|---|
| 1 | CBV-901 | 0.34 | 1.42 | 0.97 |
| 2 | ZD2K014 | 0.32 | 0.76 | 0.97 |
| 3 | CBV-90A | 0.70 | 0.59 | 0.98 |
| 4 | ZD96065 | 0.00 | 3.61 | 0.92 |
| 5 | CP 811C-300 | INF | 1.00 | 1.00 |
| 6 | CP 811E-150 | INF | 1.00 | 1.00 |
| 7 | DAY-55 | 0.20 | 1.54 | 0.98 |
| 8 | HiSiv ™ 4000 | 0.71 | 0.77 | 1.00 |
| 9 | LZ-Y52 | 0.00 | 1.00 | 1.00 |
| 10 | 13X | 0.00 | 1.00 | 1.00 |
| 11 | S-115 | 0.00 | 18.62 | 0.99 |
| 12 | AlPO$_4$-5 | 0.00 | 1.00 | 1.00 |
| 13 | PS-DVB | 1.36 | 0.68 | 0.97 |
| 14 | SPA | 0.56 | 0.82 | 1.00 |

This screening protocol identified several zeolites that had a moderate to high affinity for isoflavones present in soy whey, specifically sample 1 (CBV 901/NaY) sample 8 (HiSiV™4000), sample 2 (ZD2VK014), sample 3 (CBV-90A), sample 5 (H-Beta 150), and sample 6 (H-Beta 75). These samples are large pore, hydrophobic zeolites. The Beta zeolites, samples 5 and 6, had the highest affinity for isoflavones.

Example 2

Comparative Example of the Adsorption of Isoflavones by Organic Polymer Supports The purpose of this Example was to measure the adsorption of isoflavones by organic polymers supports for comparison with zeolites.

Two organic polymer supports, i.e., PS-DVB (Sample 13) and a specially synthesized polymeric adsorbent (Sample 14), were tested for isoflavone adsorption as described in Example 1.

Preparation of Organic Polymer Supports:

Sample 13. Poly(styrene-co-divinylbenzene)(PS-DVB)

Commercial macromolecular adsorbent Poly(styrene-co-divinylbenzene) (PS-DVB) (300-800 um) was secured from Aldrich Chemical Company (Catalog ID 41,910-9), Milwaukee, Wis. The sample was rinsed with at least 10 volumes of deionized water and stored under water prior to use. The sample was weighed wet and the equivalent dry weight was determined at the end of the experiment by oven-drying a selected wet weight.

Sample 14. A Specially Synthesized Polymeric Adsorbent Prepared by Suspension Polymerization of Methacryiic Acid, Styrene, and Ethylene Glycol Dimethacrylate.

This sample refers to a specially synthesized polymeric adsorbent (SPA) prepared by suspension polymerization of methacrylic acid, styrene and ethylene glycol dimethacrylate in the molar ratio of 9:9:83 using ethyl acetate (EtOAc) as solvent. To prepare the polymer, excess quantities of solvent and deionized water were deoxygenated for 30 min by sparging with nitrogen. The aqueous phase was prepared by stirring the water-soluble ingredients into the designated amount of sparged water under nitrogen in a round-bottom flask. A 3-neck, round-bottom reaction flask (250- or 500-mL as appropriate) was assembled with a reflux condenser, mechanical stirrer (glass rod), and thermocouple-in-well; the condenser was connected to a trap and nitrogen bubbler to maintain a slight positive pressure. When the aqueous phase components were almost completely dissolved in their round-bottom flask, the charging of the separate, 3-neck, reaction flask was begun. While flushing it with nitrogen, the flask was charged with solvent and then the monomers were transferred by syringe. The azo initiator (Vazo® 67) was added (0.2 g) by very briefly removing the thermocouple (TC) well to introduce the powder while maintaining a slight nitrogen flush. The ingredients were carefully and briefly mixed behind a shield and a drawn hood sash. The aqueous phase was added while maintaining a nitrogen flush through the flask. The mixture was stirred well and then, with the TC well removed, briefly deoxygenated again with nitrogen. Then the TC well was reinserted into the 3rd neck of the flask. With stirring at 600 rpm, the solution was brought to the desired temperature, 70° C., in a ~80° C. oil bath equipped with a TC-controlled heater and over-temperature controller. The time when the flask approached the desired reaction temperature was noted as time 0'. The reaction was run for 6 h, with stirring. The desired conversion of small monomers was ~90% or higher.

Polymerization was terminated by opening the system to air, adding 0.1 g p-methoxyphenol (MEHQ) in 10 mL EtOAc, and removing the heat source. The mixture was stirred while cooling.

The polymer beads were filtered on a coarse filter and washed 3 times, each with 50 mL of deionized water. During all filtrations, vacuum was temporarily shut off when water was added, water was well mixed with the beads, and then vacuum was turned on again to remove the water. The polymer was dried in the fume hood overnight and then in a 65° C. vacuum oven with vacuum and slight nitrogen bleed. The polymer was stored in an airtight vial and used as is.

Isoflavone Adsorption Results:

The raw data obtained for these polymers is included in Table 2 and the adsorption isotherms are shown in FIG. 2. The results of the fit to the Power equation are given in Table 3. As can be seen from FIG. 2, both of these organic polymers had a significantly lower affinity for isoflavones than the Beta zeolite samples.

Example 3

Binding Characteristics of Isoflavones to Beta Zeolites in the Presence of Oligosaccharides The purpose of this Example was to investigate the isoflavone binding characteristics of Beta zeolites.

Zeolite Sample Preparation:

Sample 15. H-Beta (Si/Al=75)

A 10 g sample of H-Beta (Si/Al=75) (CP 811 E-150, Lot No. 1822-75, Zeolyst, Valley Forge, Pa.) was calcined in air by heating 1° C./min to 450° C., holding for 10 min at 450° C., heating 1° C./min to 500° C., holding for 10 min at 500° C., heating 1° C./min to 550° C., holding 5 hours at 550° C., and then cooling to 110° C. The sample was transferred rapidly to a dry jar, which was then closed and sealed.

Samples 16-20

The zeolite samples listed in Table 4 were calcined in air by heating 1° C./minute to 400° C., holding for 10 minutes at 400° C., heating 1° C./minute to 450° C., holding for 10 minutes at 450° C., heating 1° C./minute to 500° C., holding 5 hours at 500° C., and then cooling to 110° C. The samples were transferred rapidly to dry jars, which were then closed and sealed.

TABLE 4

List of Beta zeolite samples and their source.

| Sample No. | Vendor | Product Name | Zeolite | Si/Al | Form | Lot Number |
|---|---|---|---|---|---|---|
| 16 | Zeolyst[1] | CP 814E CY | H-Beta | 12.5 | Extrudates (20% $Al_2O_3$) | 1994-3 |
| 17 | Zeolyst[1] | CP 811C-300 CY | H-Beta | 150 | Extrudates (20% $Al_2O_3$) | 2112-7 |
| 18 | Zeolyst[1] | CP 811E-150 | H-Beta | 75 | Powder | 1822-75 |
| 19 | Zeolyst[1] | CP 811C-300 | H-Beta | 150 | Powder | 1822-19 |
| 20 | Zeolyst[1] | CP 814E | H-Beta | 12.5 | Powder | 1822-52 |

[1]Valley Forge, PA

Batch adsorption experiments, as described in Example 1, with the +Beta zeolites listed in Table 4 were used to determine the equilibrium isotherms at room temperature. The parameters Qmax and B for a Langmuir fit ($q=Qmax\ B\ C/(1+B\ C)$) to the adsorption equilibrium were estimated using regression analysis. Here q, stands for the loading on the solid phase, mg/g dry solid, C is the concentration in the fluid phase at equilibrium, mg/L. Qmax and B are empirical constants. Qmax is often an approximate estimate of the monolayer binding capacity on the zeolite. An approximate binding capacity of 14-20 mg isoflavones/g zeolite, on an aglycone basis, was estimated. The parameters for a set of free flowing Beta zeolite powders with varying Si/Al ratios and the equivalent pellet samples with 20% Alumina binder are summarized in Table 5.

Figure 3:
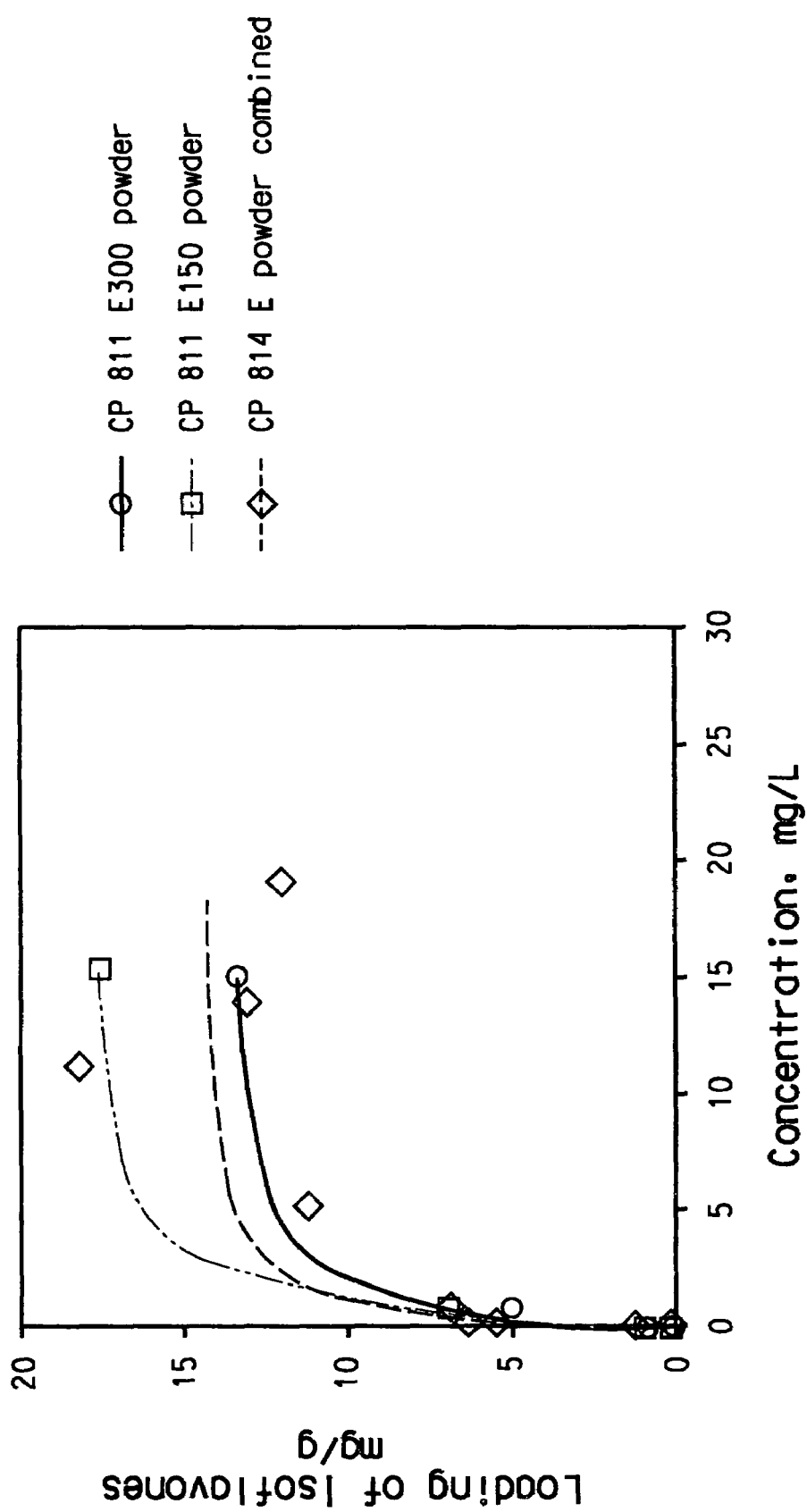
FIG. 3 shows the isotherms for the adsorption of isoflavones from soy whey onto several Beta zeolites. The x-axis is the equilibrium concentration of the isoflavones in solution in mg/L. The y-axis is the amount of isoflavones adsorbed onto the zeolite adsorbents in mg/g dry weight of zeolite.

As shown in Table 5 and in FIG. 3, the binding isotherms are only a weak function of the Si/Al ratio of Beta zeolites. The raw data for FIG. 3 is given in Table 6.

TABLE 5

Summary of the estimated Langmuir parameters for Beta zeolites.

| Sample No. | Sample Name | Si/Al ratio | Form | K (q/c at C = 0) | Q max | $R^2$ value |
|---|---|---|---|---|---|---|
| 16 | CP 814 E CY 20% alumina | 12.5 | pellets* | 0.2402 | — | 0.9785 |
| 17 | CP 811 C 300 CY 20% alumina | 150 | pellets* | 0.1636 | — | 0.9726 |
| 18 | CP 811 E 150 | 75 | powder | 18.2853 | 19.165 | 0.9973 |
| 19 | CP 811 C-300 | 150 | powder | 1.6438 | 13.977 | 0.9965 |
| 20 | CP 814 E | 12.5 | powder | 27.0807 | 14.253 | 0.8976 |

Here pellets refer to 1.6 mm extrudates of zeolite powder with specified percentage of binder.

TABLE 6

Raw data for isotherms shown in FIG. 3.

| Sample | Sample ID | Concentration, mg/L | Loading, mg/g |
|---|---|---|---|
| 19 | CP 811 C 300 | 0.00 | 0.89 |
|  |  | 0.00 | 0.30 |
|  |  | 0.49 | 5.11 |
|  |  | 15.5 | 13.2 |
| 18 | CP 811 E 150 | 0.00 | 1.12 |
|  |  | 0.00 | 0.34 |
|  |  | 0.50 | 6.19 |
|  |  | 15.4 | 17.9 |
| 20 | CP 814 E | 0.0 | 0.87 |
|  |  | 0.0 | 0.26 |
|  |  | 0.11 | 5.36 |
|  |  | 14.1 | 13.02 |
|  |  | 0.00 | 1.12 |
|  |  | 0.00 | 0.35 |
|  |  | 0.00 | 6.03 |
|  |  | 11.38 | 18.48 |
|  |  | 0.63 | 6.30 |
|  |  | 5.16 | 10.76 |
|  |  | 19.04 | 12.16 |

Figure 4:
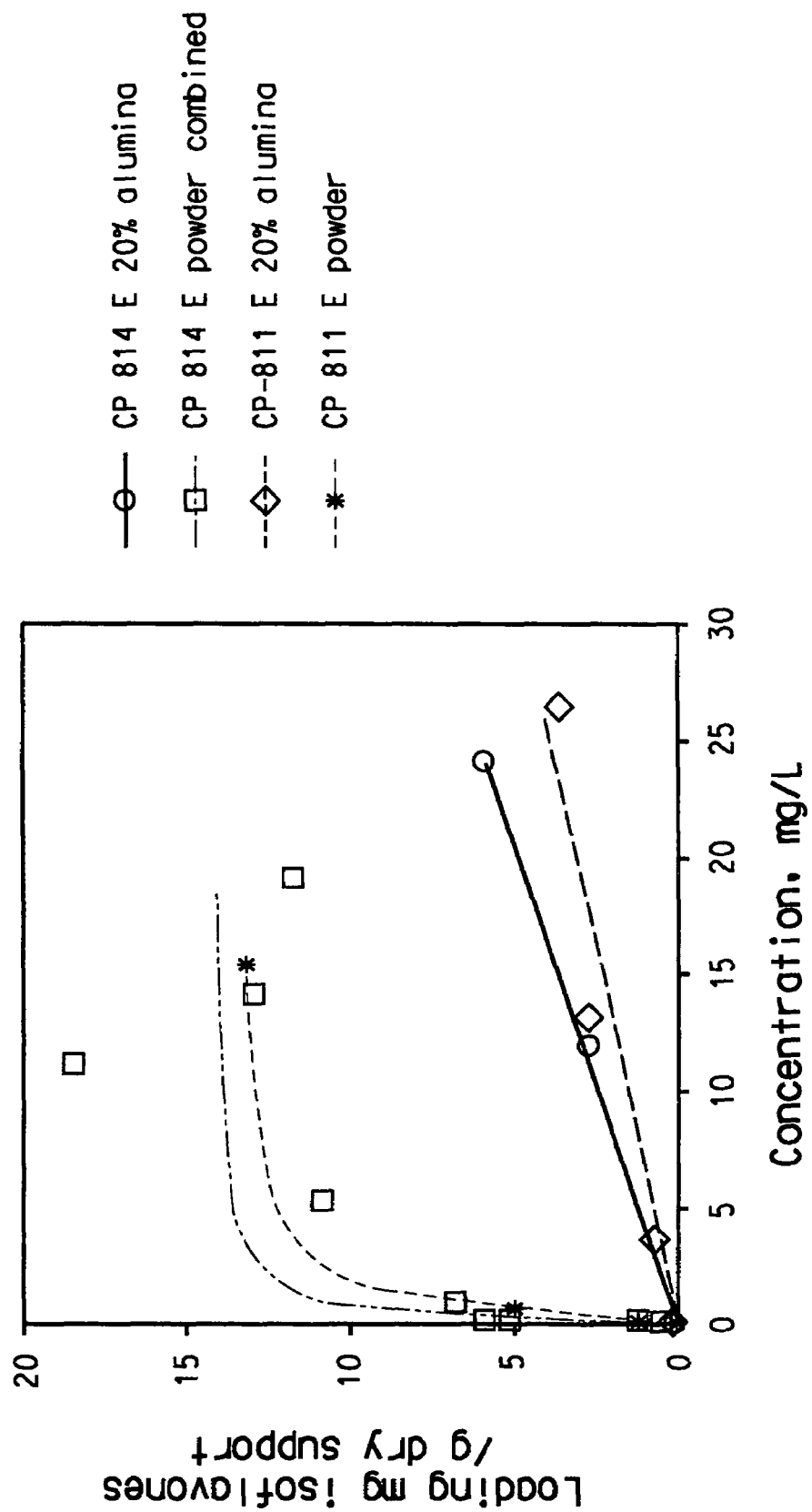
FIG. 4 shows the adsorption isotherms for the adsorption of isoflavones from soy whey onto free-flowing powders and pelleted forms of Beta zeolites. The x-axis is the equilibrium concentration of the isoflavones in solution in mg/L. The y-axis is the amount of isoflavones adsorbed onto the zeolite adsorbents in mg/g dry weight of zeolite.

Also, as shown in Table 5 and FIG. 4, zeolite powders when compounded with a binder and pelletized showed a significantly lower capacity and affinity for the isoflavones than would be accounted by simple proportional dilution of the powder sample. For example, as shown in FIG. 4, with a 20% alumina binder, the isotherms significantly deviate from their "nearly rectangular" shape to a more linear form with a lower partition coefficient between the support phase and soy whey. The raw data for FIG. 4 is given in Table 7.

TABLE 7

Raw data for the isotherms in FIG. 4.

| Sample | Sample ID | Concentration, mg/L | Loading, mg/g |
|---|---|---|---|
| 16 | CP 814 E CY 20% alumina | 0.00 | 0.94 |
|  |  | 0.00 | 0.29 |
|  |  | 12.44 | 2.89 |
|  |  | 23.81 | 5.77 |
| 20 | CP 814 E | 0.00 | 0.87 |
|  |  | 0.00 | 0.26 |
|  |  | 0.11 | 5.36 |
|  |  | 14.06 | 13.02 |
|  |  | 0.00 | 1.12 |
|  |  | 0.00 | 0.35 |
|  |  | 0.00 | 6.03 |
|  |  | 11.38 | 18.48 |
|  |  | 0.63 | 6.30 |
|  |  | 5.16 | 10.76 |
|  |  | 19.04 | 12.16 |
| 17 | CP 811 C 300 CY 20% alumina | 3.63 | 0.78 |
|  |  | 0.00 | 0.29 |
|  |  | 13.32 | 2.82 |
|  |  | 26.4 | 3.97 |
| 19 | CP 811 C 300 powder | 0.00 | 0.89 |
|  |  | 0.00 | 0.30 |
|  |  | 0.49 | 5.11 |
|  |  | 15.5 | 13.25 |

Example 4

Absence of Adsorption of Oligosaccharides such as Raffinose and Stachyose onto Beta Zeolites The purpose of this Example was to test the adsorption of sugars onto Beta Zeolites.

Adsorption of sugars, including the oligosaccharides raffinose and stachyose, to Beta zeolite (Sample 18, CP 811 E 150) was tested by contacting varying amounts of the zeolite with a fixed volume (2.5 mL) of soy whey. The final concentration of each sugar in solution was determined using ion chromatography and the estimated amount adsorbed onto the zeolite is shown in Table 8. In each case at equilibrium, the amount of the sugar on the zeolite surface is less than 1% of the corresponding solution concentration, indicating that there is negligible adsorption of the sugars to the Beta zeolite.

TABLE 8

Adsorption of Sugars onto Beta zeolite (Sample 18).

| Compound | Solution Concentration, ppm | Adsorbed ppm | (Adsorbed/ Concentration)% |
|---|---|---|---|
| Glucose | 2480 | −4.8 | −0.2 |
| Glucose | 1897 | 7.5 | 0.4 |
| Glucose | 1546 | 7.1 | 0.5 |
| Glucose | 1761 | 3.0 | 0.2 |
| Sucrose | 962 | 0.3 | 0.0 |
| Sucrose | 716 | 4.0 | 0.6 |
| Sucrose | 554 | 3.5 | 0.6 |
| Sucrose | 676 | 1.4 | 0.2 |
| Raffinose | 706 | −3.4 | −0.5 |
| Raffinose | 491 | 2.2 | 0.4 |
| Raffinose | 379 | 2.2 | 0.6 |
| Raffinose | 450 | 0.9 | 0.2 |
| Stachyose | 3110 | −21.0 | −0.7 |
| Stachyose | 2190 | 7.2 | 0.3 |
| Stachyose | 1674 | 8.3 | 0.5 |
| Stachyose | 2006 | 3.1 | 0.2 |

As shown in FIG. 2, a preferred zeolite for use in this invention for recovering isoflavones, zeolite Beta, has a significantly higher affinity for isoflavones than the conventional poly(styrene-co-divinylbenzene) (PS-DVB) adsorbent and the specifically synthesized polymeric adsorbent prepared by suspension polymerization of methacrylic acid, styrene, and ethylene glycol dimethacrylate. Moreover, zeolite Beta was found to have essentially no adsorption of oligosaccharides, including the undesired oligosaccharides raffinose and stachyose, as shown in Example 4.

Example 5

Recovery of Isoflavones from Loaded Beta Zeolites using Anhydrous Ethanol as an Eluant The purpose of this Example was to test the recovery of adsorbed isoflavones from Beta zeolites using ethanol as eluant.

A sample of zeolite Beta pellets (Sample 17, CP 811 C 300 CY 20% alumina, 1-5 g) was loaded with isoflavones such that the zeolite was in equilibrium with the isoflavones in the soy whey. This was accomplished by repeatedly contacting the zeolite sample with a large volume of diluted soy whey (1-10 L). A sample of the whey was tested using HPLC to monitor the change in isoflavone concentration. When there was little change in the concentration of the contacted whey, the sample was assumed to have reached a saturation loading. This sample was then filtered out from the whey and contacted with a measured volume (100-500 mL) of anhydrous ethanol. A sample (typically 1 mL) of ethanol was analyzed for isoflavones using HPLC. The process was repeated till there was no isoflavone recovered off the zeolite. The isoflavones were eluted with the ethanol fraction. The ethanol was then evaporated to recover a concentrated sample of the isoflavones. The fractional recovery (%) of isoflavones ranged from 37% to 61% (ratio of isoflavones recovered in ethanol fraction to that estimated to be bound to the zeolite from the decrease in concentration during the loading, expressed as a percentage).

Example 6

Screening of Various Zeolites for Selective Adsorption of Sugars

The purpose of this Example was to test a variety of zeolites for the selective adsorption of raffinose and stachyose from dilute soy whey.

Approximately 5 g of each of the zeolite samples listed in Table 9 was calcined in air by raising the temperature 1° C./min to 450° C., holding for 10 min, then raising the temperature 1° C./min to 500° C., holding for 10 min at 500° C., and finally raising the temperature 1° C./min to 550° C. and holding for 5 h.

TABLE 10

Sugar Concentrations of Soy Whey Samples.

| Whey Solution | Glucose (ppm) | Fructose (ppm) | Sucrose (ppm) | Raffinose (ppm) | Stachyose (ppm) |
|---|---|---|---|---|---|
| 1 | 54 | Not measured | 732 | 2175 | Not measured |
| 2 | 86 | 48 | 3019 | 766 | 3153 |
| 3 | 112 | 77 | 3055 | 836 | 3219 |
| 4 | 111 | 78 | 3061 | 797 | 3075 |
| 5 | 98 | 42 | 2524 | 700 | 2963 |
| 6 | 89 | 0 | 1989 | 611 | 2717 |
| 7 | 58 | 11 | 2120 | 394 | 1966 |

Each zeolite (approximately 1 g) was incubated with 4 mL of a soy whey sample in a 10 mL syringe for 15 min. After this time, the mixture was filtered through a 0.2 μm filter and the supernatant was analyzed for sugars using ion chromatography, as described above.

The amount of each sugar adsorbed was determined from the difference in the solution concentration before and after contact with the zeolite and is expressed as a percent in Table 11. As can be seen from the data in the table, only samples 11 (HiSiv-4000) and 13 (CBV-901) adsorbed significant amounts of the undesired oligosaccharides, raffinose and stachyose, in the presence of other sugars. The DAY-55 (sample 12) which was reported to adsorb oligosaccharides (Buttersack et al. Langmuir 12:3101 (1996)), did not adsorb a significant amount of raffinose or stachyose in the presence of the other sugars. This result demonstrates that the adsorption

TABLE 9

List of Zeolite Samples Used and Their Source.

| Sample | Vendor | Product Name | Zeolite Framework | Form | Lot Number |
|---|---|---|---|---|---|
| 1 | PQ[1] | Zeolite P | GIS | Powder | 1643-70 |
| 2 | UOP[2] | S-115 | MFI | Powder | 5676-50 |
| 3 | UOP[2] | HiSiv-3000 | unknown | Powder | 917796060009 |
| 4 | Engelhard[3] | EZ-500 | FER | Powder | 29835 |
| 5 | Zeolyst[1] | CBV-90A | MOR | Powder | 1822-60-30 |
| 6 | Zeolyst[1] | ZD-96081 | MOR | Powder | 2061-57-1 |
| 7 | Chemie Uetikon[4] | Zeocat L | LTL | Powder | 109 |
| 8 | Zeolyst[1] | CP 811 E-150 | BEA | Powder | 1822-75 |
| 9 | UOP[2] | AlPO$_4$-5 | AFI | Powder | 13551-91-25C |
| 10 | Aldrich[5] | NaX | FAU | Powder | 01820CY |
| 11 | UOP[2] | HiSiv-4000 | Unknown | Powder | 976594061 |
| 12 | Degussa[6] | DAY-55 | FAU | Powder | TC133 |
| 13 | Zeolyst[1] | CBV-901 | FAU | Powder | 1822-66 |
| 14 | UOP[2] | CaA | LTA | Powder | Unknown |
| 15 | Alfa | NaA | LTA | Powder | B12G |

[1]Valley Forge, PA
[2]Des Plaines, IL
[3]Iselin, NJ
[4]Uetikon, Switzerland
[5]Milwaukee, WI
[6]South Plainfield, NJ
[7]Ward Hill, MA The sugar concentrations of several soy whey samples were measured using ion chromatography, as described above and the results are given in Table 10.

selectivity of this zeolite is different when tested in the presence of other sugars than when tested with a single sugar solution.

TABLE 11

Results of the Adsorption of Sugars by Various Zeolites.

| Zeolite | Zeolite Pore Size | Soy Whey Sample | % Glucose Adsorbed | % Fructose Adsorbed | % Sucrose Adsorbed | % Raffinose Adsorbed | % Stachyose Adsorbed |
|---|---|---|---|---|---|---|---|
| 1. Zeolite P | small | 3 | −1 | 13 | 3 | 3 | 4 |
| 2. S-115 | medium | 1 | −7 | Not measured | −2 | −3 | Not measured |
| 3. HiSiv-3000 | medium | 2 | −5 | 21 | −3 | 0 | −1 |
| 4. EZ-500 | medium | 1 | −2 | Not measured | 0 | 0 | Not measured |
| 5. CBV-90A | large | 3 | −9 | −5 | 0 | 0 | 2 |
| 6. ZD-96081 | large | 3 | −1 | 13 | 0 | 0 | 1 |
| 7. ZeocatL | large | 1 | 0 | Not measured | 2 | 5 | Not measured |
| 8. CP-811E-150 | large | 7 | 21 | −34 | 4 | −1 | 4 |
| 9. ALPO$_4$-5 | large | 3 | −6 | 1 | 2 | −1 | 2 |
| 10. NaX | large | 5 | 2 | 9 | −3 | −2 | −2 |
| 11. HiSiv-4000 | large | 2 | 17 | 58 | 64 | 70 | 85 |
| 12. DAY-55 | large | 7 | 2 | −36 | 19 | −8 | −6 |
| 13. CBV-901 | large | 3 | −1 | 16 | 76 | 76 | 96 |
| 14. CaA | small | 5 | 6 | 17 | 1 | 3 | 0.4 |
| 15. NaA | small | 5 | −3 | 0 | −4 | −4 | −3 |

Example 7

Comparative Example of the Adsorption of Sugars by Other Adsorbents

The purpose of this example was to measure the adsorption of sugars from dilute soy whey by other commonly used adsorbents.

The adsorbents tested are listed in Table 12. The carbon adsorbents (Samples 1 and 2) were used as received. The silica-based adsorbents (Samples 3 and 4) were calcined as described in Example 6.

TABLE 12

List of Adsorbents Used and Their Source

| Adsorbent | Vendor | Product Name | Type | Lot Number |
|---|---|---|---|---|
| 1 | Institute of Technical Carbon[1] | Sibunit #2 | Carbon | unknown |

TABLE 12-continued

List of Adsorbents Used and Their Source

| Adsorbent | Vendor | Product Name | Type | Lot Number |
|---|---|---|---|---|
| 2 | Institute of Technical Carbon[1] | Sibunit #4 | Carbon | unknown |
| 3 | PQ[2] | MA-1030 | Silica | 1676-36-2 |
| 4 | PQ[2] | MS-3050 | Silica | 1902-57-2 |

[1]Omsk, Russia
[2]Valley Forge, PA

These adsorbents were tested for sugar adsorption as described in Example 6 and the results are given in Table 13. As can be seen, none of these adsorbents selectively adsorbed the undesired oligosaccharides, raffinose and stachyose. The carbon adsorbents adsorbed all sugars nonselectively, while the silica adsorbents did not adsorb significant amounts of any of the sugars.

TABLE 13

Adsorption of Sugars by Carbon and Silica Adsorbents

| Adsorbent | Soy Whey Sample | % Glucose Adsorbed | % Fructose Adsorbed | % Sucrose Adsorbed | % Raffinose Adsorbed | % Stachyose Adsorbed |
|---|---|---|---|---|---|---|
| 1 Sibunit #2 | 4 | 63 | 68 | 64 | 62 | 56 |
| 2 Sibunit #4 | 2 | 64 | 90 | 49 | 68 | 63 |
| 3 MA-1030 | 3 | 2 | 13 | 5 | 4 | 5 |
| 4 MS-3050 | 3 | 2 | 9 | 3 | 5 | 5 |

Example 8

Comparative Example of the Selectivity of Zeolites CBV-901 and DAY-55 in Single Sugar Solutions The purpose of this Example was to compare the selectivity of the zeolites CBV-901 and DAY-55 in the adsorption of sugars from solutions containing single sugars.

A known mass of the dry zeolite sample (typically 0.2-5 g) of either, CBV-901 or DAY-55, prepared as described in Example 6, was contacted with a known volume of a sample containing an aqueous solution of either stachyose, raffinose, or sucrose at varying concentrations between 0 and 10 g/L. Samples containing the zeolite were placed on a laboratory rotary shaker (typically set at 200 rpm) and shaken at room temperature for 4-24 h. A portion of the supernatant (typically 1 mL) was withdrawn, filtered, and assayed for sugars using ion chromatography, as described above.

Figure 5:
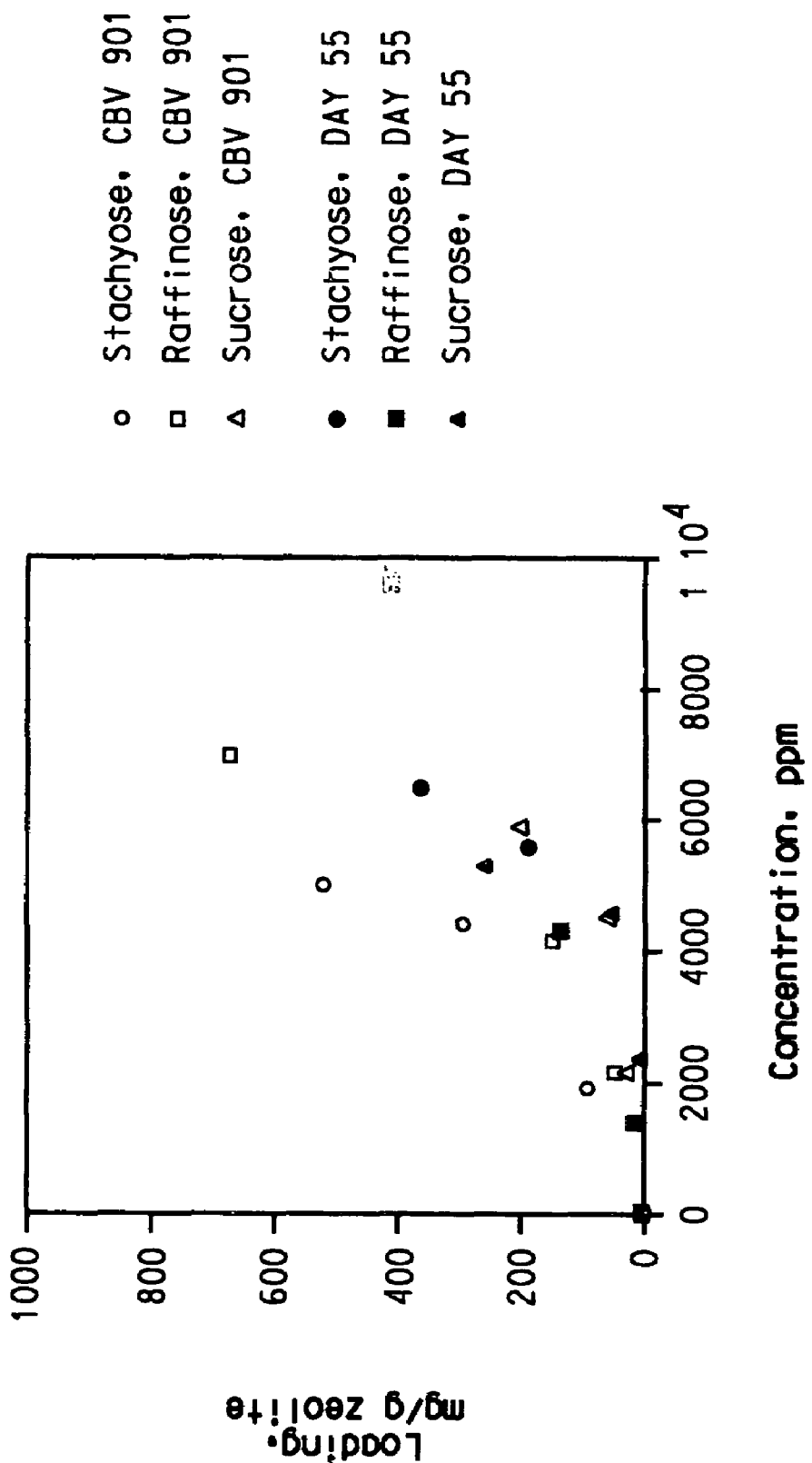
FIG. 5 shows the adsorption of sugars from single sugar solutions by the zeolites CBV-901 and DAY-55.

The results for the adsorption of the sugars stachyose, raffinose, and sucrose by the zeolites CBV-901 and Day-55 from single sugar solutions is shown in FIG. 5. In this figure, the amount of each sugar adsorbed by each zeolite in mg/g of zeolite is plotted against the equilibrium sugar concentration in ppm. The raw data for this graph is given in Table 14. As can be seen from FIG. 5, CBV-901 is a more effective adsorbent for stachyose and raffinose from single sugar solutions than DAY-55. The adsorption of sucrose was similar for both zeolites.

Example 9

Comparative Example of the Selectivity of Zeolites CBV-901 and DAY-55 in Multi-Component Sugar Solutions The purpose of this Example was to compare the selectivity of the zeolites CBV-901 and DAY-55 in the adsorption of sugars from solutions containing a mixture of sugars.

The adsorption experiments were done as described in Example 8, except that a sample solution containing an aqueous mixture of the sugars stachyose, raffinose, sucrose, and glucose at varying concentrations between 0 and 3 g/L was used.

Figure 6:
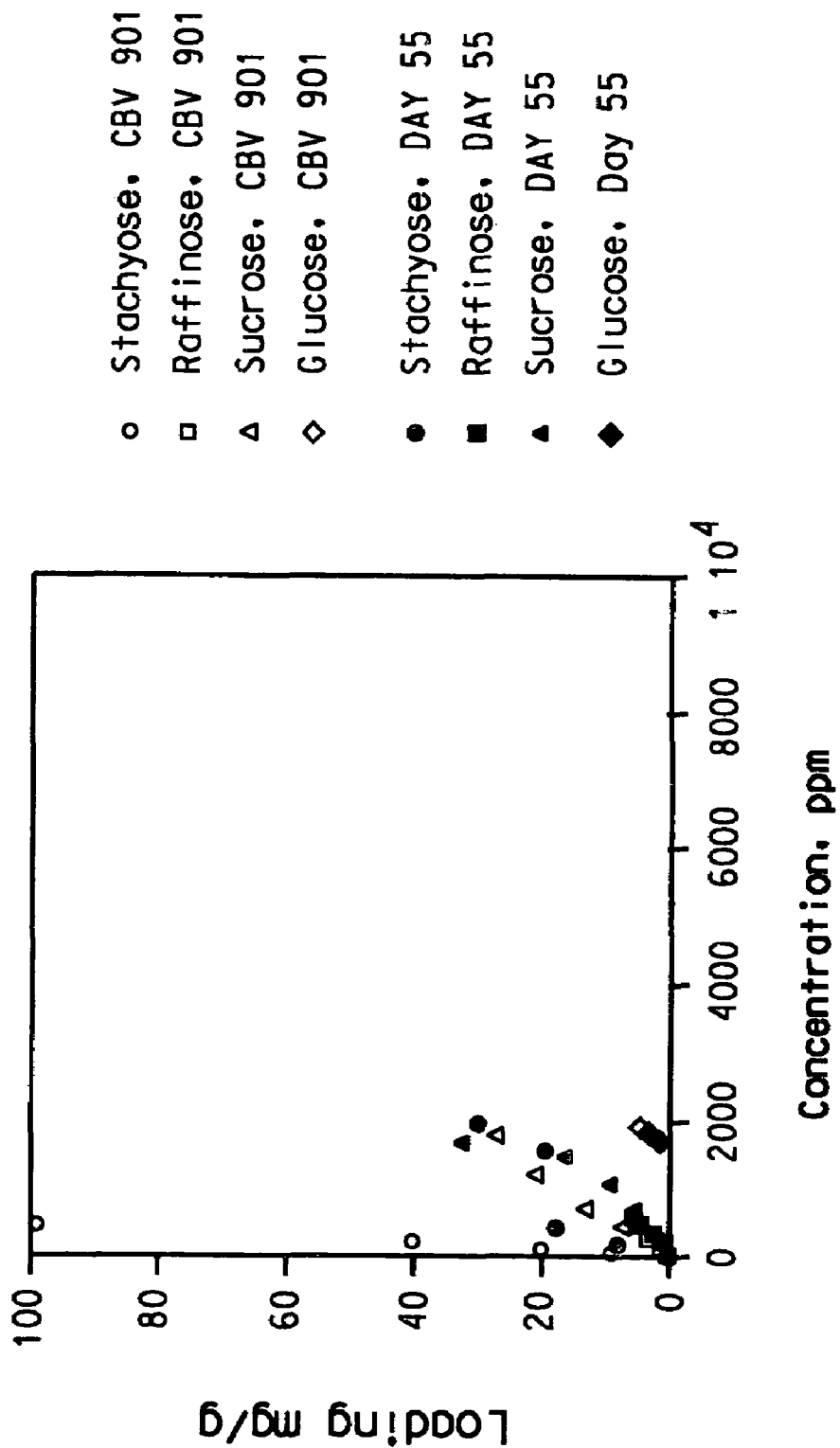
FIG. 6 shows the adsorption of sugars from multi-component sugar solutions by the zeolites CBV-901 and DAY-55.

The results for the adsorption of the sugars stachyose, raffinose, sucrose, and glucose by the zeolites CBV-901 and DAY-55 from multi-component sugar solutions is shown in FIG. 6. In this figure, the amount of each sugar adsorbed from the mixture in mg/g of zeolite is plotted against the equilibrium concentration of each sugar in ppm. The raw data for this figure is given in Table 15. As shown in FIG. 6, zeolite CBV-901 is a significantly more effective adsorbent than DAY-55 for the adsorption of the sugars stachyose, raffinose, and sucrose from solutions containing mixtures of the sugars.

TABLE 14

Raw Data for the Adsorption of Sugars from Single Sugar Solutions by Zeolites CBV-901 and DAY-55.

| Concentration, ppm | CBV-901 Stachyose Loading, mg/g | CBV-901 Raffinose Loading, mg/g | CBV-901 Sucrose Loading, mg/g | DAY-55 Stachyose Loading, mg/g | DAY-55 Raffinose Loading, mg/g | DAY-55 Sucrose Loading, mg/g |
|---|---|---|---|---|---|---|
| 0.0 | 0.0 | 0.0 | 0.0 | 0.0 | 0.0 | 0.0 |
| 1904.3 | 83.9 | — | — | — | — | — |
| 4405.5 | 296.3 | — | — | — | — | — |
| 5081.1 | 518.4 | — | — | — | — | — |
| 1532.2 | — | −4.4 | — | — | — | — |
| 2192.5 | — | 47.2 | — | — | — | — |
| 4191.2 | — | 141.0 | — | — | — | — |
| 7069.7 | — | 676.5 | — | — | — | — |
| 2181.5 | — | — | 22.1 | — | — | — |
| 4532.5 | — | — | 47.6 | — | — | — |
| 5898.5 | — | — | 204.6 | — | — | — |
| 2802.7 | — | — | — | −6.0 | — | — |
| 5448.7 | — | — | — | 192.0 | — | — |
| 6707.2 | — | — | — | 355.8 | — | — |
| 1416.4 | — | — | — | — | 18.7 | — |
| 2775.9 | — | — | — | — | −69.5 | — |
| 4325.0 | — | — | — | — | 127.7 | — |
| 9569.7 | — | — | — | — | 426.5 | — |
| 2347.5 | — | — | — | — | — | 5.5 |
| 4570.2 | — | — | — | — | — | 43.9 |
| 5307.8 | — | — | — | — | — | 263.7 |

TABLE 15

Raw Data for the Adsorption of Sugars from Multicomponent
Sugar Solutions by the Zeolites CBV 901 and Day-55

| Concentration, ppm | CBV-901 Stachyose Loading, mg/g | CBV-901 Raffinose Loading, mg/g | CBV-901 Sucrose Loading, mg/g | CBV-901 Glucose Loading, mg/g | DAY-55 Stachyose Loading, mg/g | DAY-55 Raffinose Loading, mg/g | DAY-55 Sucrose Loading, mg/g | DAY-55 Glucose Loading, mg/g |
|---|---|---|---|---|---|---|---|---|
| 620.4 | 98.5 | — | — | — | — | — | — | — |
| 192.9 | 40.0 | — | — | — | — | — | — | — |
| 128.7 | 20.5 | — | — | — | — | — | — | — |
| 87.4 | 10.4 | — | — | — | — | — | — | — |
| 0.0 | 0.0 | — | — | — | — | — | — | — |
| 488.8 | — | 6.4 | — | — | — | — | — | — |
| 305.8 | — | 5.2 | — | — | — | — | — | — |
| 211.2 | — | 3.4 | — | — | — | — | — | — |
| 132.4 | — | 2.0 | — | — | — | — | — | — |
| 0.0 | — | 0.0 | — | — | — | — | — | — |
| 1839.1 | — | — | 26.7 | — | — | — | — | — |
| 1081.5 | — | — | 21.5 | — | — | — | — | — |
| 683.0 | — | — | 14.1 | — | — | — | — | — |
| 383.7 | — | — | 8.3 | — | — | — | — | — |
| 0.0 | — | — | 0.0 | — | — | — | — | — |
| 1829.0 | — | — | — | 2.9 | — | — | — | — |
| 1797.9 | — | — | — | 1.5 | — | — | — | — |
| 1732.2 | — | — | — | 1.3 | — | — | — | — |
| 1724.6 | — | — | — | 0.7 | — | — | — | — |
| 0.0 | — | — | — | 0.0 | — | — | — | — |
| 1988.5 | — | — | — | — | 30.1 | — | — | — |
| 1381.7 | — | — | — | — | 20.2 | — | — | — |
| 432.7 | — | — | — | — | 18.0 | — | — | — |
| 200.9 | — | — | — | — | 10.0 | — | — | — |
| 0.0 | — | — | — | — | 0.0 | — | — | — |
| 478.9 | — | — | — | — | — | 6.9 | — | — |
| 390.5 | — | — | — | — | — | 3.8 | — | — |
| 296.7 | — | — | — | — | — | 2.7 | — | — |
| 198.9 | — | — | — | — | — | 1.7 | — | — |
| 0.0 | — | — | — | — | — | 0.0 | — | — |
| 1732.1 | — | — | — | — | — | — | 32.0 | — |
| 1340.5 | — | — | — | — | — | — | 17.2 | — |
| 976.7 | — | — | — | — | — | — | 11.6 | — |
| 599.2 | — | — | — | — | — | — | 7.4 | — |
| 0.0 | — | — | — | — | — | — | 0.0 | — |
| 1740.3 | — | — | — | — | — | — | — | 7.3 |
| 1777.1 | — | — | — | — | — | — | — | 1.8 |
| 1690.3 | — | — | — | — | — | — | — | 1.6 |
| 1633.2 | — | — | — | — | — | — | — | 1.1 |
| 0.0 | — | — | — | — | — | — | — | 0.0 |

Example 10

Comparative Example of the Selectivity of Zeolites CBV-901 and DAY-55 in Dilute Soy Whey Solution The purpose of this example was to compare the selectivity of the zeolites CBV-901 and DAY-55 in the adsorption of sugars from dilute soy whey solutions.

The adsorption experiments were done as described in Example 8, except that the sample solution was dilute soy whey.

Figure 7:
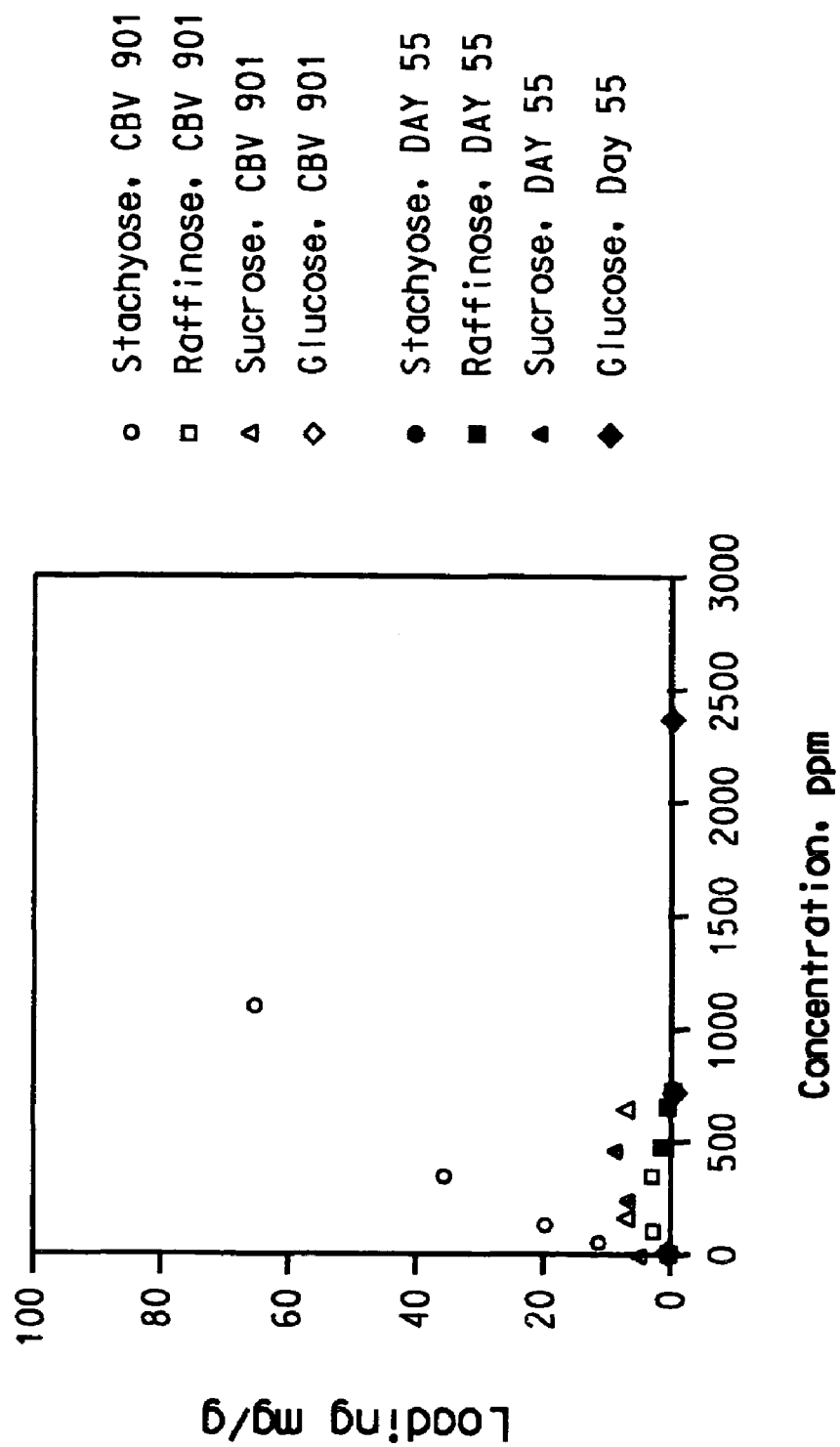
FIG. 7 shows the adsorption of sugars from dilute soy whey by the zeolites CBV-901 and DAY-55.

The results for the adsorption of the sugars stachyose, raffinose, sucrose, and glucose by the zeolites CBV-901 and DAY-55 from dilute soy whey is shown in FIG. 7. In this figure, the amount of each sugar adsorbed by each zeolite in mg/g of zeolite is plotted against the equilibrium concentration of the sugar in ppm. The raw data for this figure is given in Table 16. As shown in this figure, the difference in adsorption of the sugars by the two zeolites is even more marked in the presence of dilute soy whey. There was relatively little adsorption of any sugar other than sucrose by Day-55, while CBV-901 adsorbed significant amounts of stachyose and some sucrose and raffinose. These results demonstrate the superior selectivity of CBV-901 for removing the undesired sugars stachyose and raffinose from soy whey.

TABLE 16

Raw Data for the Adsorption of Sugars from Dilute Soy Whey by the Zeolites CBV-901 and DAY-55

| Concentration, ppm | CBV-901 Stachyose Loading, mg/g | CBV-901 Raffinose Loading, mg/g | CBV-901 Sucrose Loading, mg/g | CBV-901 Glucose Loading, mg/g | DAY-55 Stachyose Loading, mg/g | DAY-55 Raffinose Loading, mg/g | DAY-55 Sucrose Loading, mg/g | DAY-55 Glucose Loading, mg/g |
|---|---|---|---|---|---|---|---|---|
| 1084.0 | 65.7 | — | — | — | — | — | — | — |
| 358.0 | 35.2 | — | — | — | — | — | — | — |
| 161.0 | 20.3 | — | — | — | — | — | — | — |
| 55.0 | 13.1 | — | — | — | — | — | — | — |
| 612.0 | — | 0.3 | — | — | — | — | — | — |
| 318.0 | — | 2.6 | — | — | — | — | — | — |
| 112.0 | — | 2.6 | — | — | — | — | — | — |
| 1118.0 | — | — | −6.3 | — | — | — | — | — |
| 589.0 | — | — | 5.8 | — | — | — | — | — |
| 171.0 | — | — | 6.5 | — | — | — | — | — |
| 0.0 | — | — | 4.9 | — | — | — | — | — |
| 2931.0 | — | — | — | −4.6 | — | — | — | — |
| 1820.0 | — | — | — | 2.8 | — | — | — | — |
| 2785.0 | — | — | — | — | −2.1 | — | — | — |
| 2754.0 | — | — | — | — | −0.9 | — | — | — |
| 2668.0 | — | — | — | — | −0.1 | — | — | — |
| 627.0 | — | — | — | — | — | 0.1 | — | — |
| 563.0 | — | — | — | — | — | 0.6 | — | — |
| 430.0 | — | — | — | — | — | 1.0 | — | — |
| 450.0 | — | — | — | — | — | — | 8.1 | — |
| 229.0 | — | — | — | — | — | — | 6.3 | — |
| 0.0 | — | — | — | — | — | — | 4.7 | — |
| 2461.0 | — | — | — | — | — | — | — | −1.4 |
| 2365.0 | — | — | — | — | — | — | — | 0.1 |
| 2400.0 | — | — | — | — | — | — | — | −0.1 |

Example 11

Adsorption of Oligosaccharides from Soy Whey after Removal of Isoflavones

The purpose of this example was to test the adsorption of oligosaccharides from soy whey using zeolite ZBV-901 after the soy whey was treated with zeolite Beta to remove isoflavones.

Figure 8:
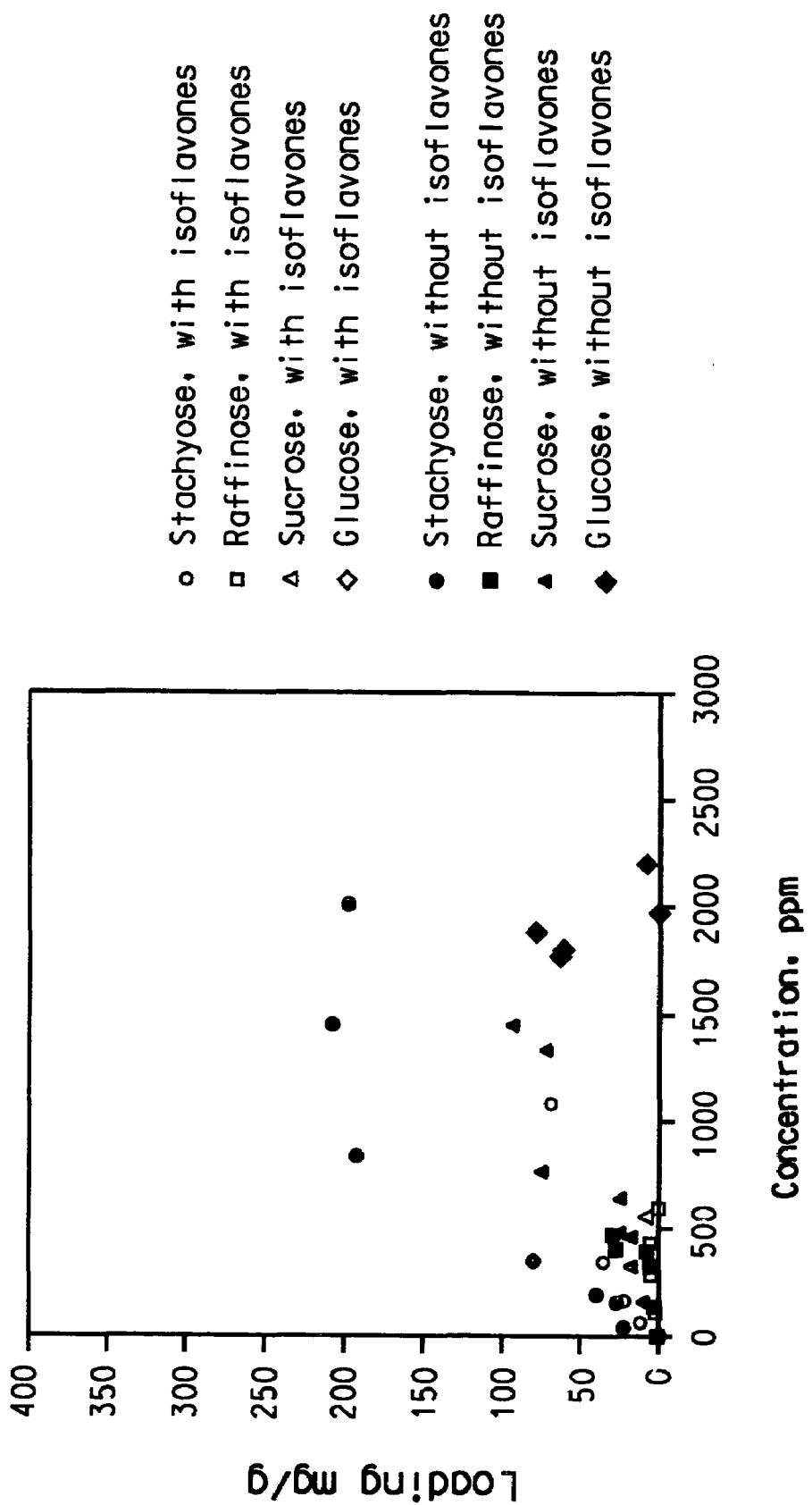
FIG. 8 shows the adsorption of sugars from dilute soy whey by the zeolite CBV-901 before and after treatment with zeolite Beta to remove isoflavones.

A soy whey sample was treated with zeolite Beta as described in Example 1 to remove isoflavones. The treated sample was then contacted with zeolite ZBV-901 as described in Example 8 to test for oligosaccharide adsorption in the absence of isoflavones. The sugar concentrations in the treated sample was determined using ion chromatography as described above. These results were compared to those obtained for oligosaccharide adsorption from soy whey without treatment to remove isoflavones. The results of this study are given in FIG. 8, which is a plot of the amount of each sugar adsorbed from the soy whey in mg/g of zeolite versus the equilibrium concentration of each sugar in ppm. The raw data for this figure is given in Table 17. As can be seen in FIG. 8, the uptake of oligosaccharides from dilute soy whey by Zeolite CBV-901 is significantly greater after the isoflavones have been removed. This result suggests that there is a competition between oligosaccharides and isoflavones for the binding sites in the Zeolite CBV-901.

TABLE 17

Raw Data for the Adsorption of Sugars on Zeolite CBV-901 from Dilute Soy Whey Before and After Treatment with Zeolite Beta to Remove Isoflavones.

| | Multicomponent whey with isoflavones | | | | Multicomponent whey without isoflavones | | | |
|---|---|---|---|---|---|---|---|---|
| Concentration, ppm | Stachyose Loading, mg/g | Raffinose Loading, mg/g | Sucrose Loading, mg/g | Stachyose Loading, mg/g | Stachyose Loading, mg/g | Raffinose Loading, mg/g | Sucrose Loading, mg/g | Glucose Loading, mg/g |
| 1084.0 | 65.7 | — | — | — | — | — | — | — |
| 358.0 | 35.2 | — | — | — | — | — | — | — |
| 161.0 | 20.3 | — | — | — | — | — | — | — |
| 55.0 | 13.1 | — | — | — | — | — | — | — |
| 0.0 | 0.0 | — | — | — | — | — | — | — |
| 845.0 | — | −9.0 | — | — | — | — | — | — |
| 612.0 | — | 0.3 | — | — | — | — | — | — |
| 318.0 | — | 2.6 | — | — | — | — | — | — |
| 112.0 | — | 2.6 | — | — | — | — | — | — |
| 0.0 | — | 0.0 | — | — | — | — | — | — |
| 1118.0 | — | — | −6.3 | — | — | — | — | — |
| 589.0 | — | — | 5.8 | — | — | — | — | — |
| 171.0 | — | — | 6.5 | — | — | — | — | — |

TABLE 17-continued

Raw Data for the Adsorption of Sugars on Zeolite CBV-901 from Dilute Soy Whey Before and After Treatment with Zeolite Beta to Remove Isoflavones.

| | Multicomponent whey with isoflavones | | | | Multicomponent whey without isoflavones | | | |
|---|---|---|---|---|---|---|---|---|
| Concentration, ppm | Stachyose Loading, mg/g | Raffinose Loading, mg/g | Sucrose Loading, mg/g | Stachyose Loading, mg/g | Stachyose Loading, mg/g | Raffinose Loading, mg/g | Sucrose Loading, mg/g | Glucose Loading, mg/g |
| 0.0 | — | — | 4.9 | — | — | — | — | — |
| 0.0 | — | — | 0.0 | — | — | — | — | — |
| 3638.0 | — | — | — | −53.1 | — | — | — | — |
| 3980.0 | — | — | — | −24.7 | — | — | — | — |
| 2931.0 | — | — | — | −4.6 | — | — | — | — |
| 1820.0 | — | — | — | 2.8 | — | — | — | — |
| 0.0 | — | — | — | 0.0 | — | — | — | — |
| 832.0 | — | — | — | — | 189.4 | — | — | — |
| 327.0 | — | — | — | — | 77.4 | — | — | — |
| 186.0 | — | — | — | — | 42.8 | — | — | — |
| 158.0 | — | — | — | — | 27.0 | — | — | — |
| 0.0 | — | — | — | — | 0.0 | — | — | — |
| 1444.5 | — | — | — | — | 207.6 | — | — | — |
| 1994.0 | — | — | — | — | 195.5 | — | — | — |
| 40.3 | — | — | — | — | 24.4 | — | — | — |
| 365.0 | — | — | — | — | — | 25.8 | — | — |
| 424.0 | — | — | — | — | — | 6.7 | — | — |
| 354.0 | — | — | — | — | — | 4.6 | — | — |
| 344.0 | — | — | — | — | — | 3.0 | — | — |
| 0.0 | — | — | — | — | — | 0.0 | — | — |
| 378.2 | — | — | — | — | — | 23.5 | — | — |
| 428.9 | — | — | — | — | — | 26.7 | — | — |
| 141.7 | — | — | — | — | — | 3.5 | — | — |
| 763.0 | — | — | — | — | — | — | 73.6 | — |
| 702.0 | — | — | — | — | — | — | 26.0 | — |
| 479.0 | — | — | — | — | — | — | 17.1 | — |
| 335.0 | — | — | — | — | — | — | 12.1 | — |
| 0.0 | — | — | — | — | — | — | 0.0 | — |
| 1327.4 | — | — | — | — | — | — | 71.3 | — |
| 1453.4 | — | — | — | — | — | — | 92.2 | — |
| 462.2 | — | — | — | — | — | — | 12.2 | — |
| 1745.0 | — | — | — | — | — | — | — | 62.6 |
| 2205.0 | — | — | — | — | — | — | — | 6.5 |
| 2461.0 | — | — | — | — | — | — | — | −0.7 |
| 3174.0 | — | — | — | — | — | — | — | −7.5 |
| 0.0 | — | — | — | — | — | — | — | 0.0 |
| 1716.0 | — | — | — | — | — | — | — | 63.9 |
| 1841.5 | — | — | — | — | — | — | — | 77.7 |
| 1973.9 | — | — | — | — | — | — | — | 0.62 |

What is claimed is:

1. A method for selectively recovering isoflavones and removing the oligosaccharides raffinose and stachyose from an aqueous mixture comprising said isoflavones, said oligosaccharides raffinose and stachyose, and digestible sugars, the method comprising the steps of:

(a) contacting a beta zeolite with the aqueous mixture, whereby at least a portion of said isoflavones are adsorbed onto the beta zeolite to form adsorbed isoflavones;

(b) separating the beta zeolite from the aqueous mixture resulting from step (a);

(c) contacting the beta zeolite separated in step (b) with an organic solvent to release the adsorbed isoflavones;

(d) contacting the aqueous mixture remaining after step (b) with an ultrastabilized, hydrophobic zeolite Y having a Si/Al ratio of about 10 to about 45, whereby at least a portion of said oligosaccharides raffinose and stachyose bind to said ultrastabilized hydrophobic zeolite Y and is selectively removed from the aqueous mixture, thereby forming an aqueous mixture having an increased proportion of the digestible sugars relative to the oligosaccharides;

(e) separating the ultrastabilized, hydrophobic zeolite Y from the aqueous mixture resulting from step (d); and (f) recovering the aqueous mixture remaining after step (e).

2. A method of using a beta zeolite and an ultrastabilized, hydrophobic zeolite Y having a Si/Al ratio of about 10 to about 45 for selectively recovering isoflavones and removing the oligosaccharides raffinose and stachyose from an aqueous mixture comprising said isoflavones, said oligosaccharides raffinose and stachyose, and digestible sugars, the method comprising the steps of:

(a) contacting the beta zeolite with the aqueous mixture, whereby at least a portion of said isoflavones are adsorbed onto the beta zeolite to form adsorbed isoflavones;

(b) separating the beta zeolite from the aqueous mixture resulting from step (a);

(c) contacting the beta zeolite separated in step (b) with an organic solvent to release the adsorbed isoflavones;

(d) contacting the aqueous mixture remaining after step (b) with the ultrastabilized, hydrophobic zeolite Y having a Si/Al ratio of about 10 to about 45, whereby at least a portion of said oligosaccharides raffinose and stachyose bind to said ultrastabilized hydrophobic zeolite Y and is selectively removed from the aqueous mixture, thereby forming an aqueous mixture having an increased proportion of the digestible sugars relative to the oligosaccharides;

(e) separating the ultrastabilized, hydrophobic zeolite Y from the aqueous mixture resulting from step (d); and (f) recovering the aqueous mixture remaining after step (e).

3. The method of claim 1 or 2 wherein the aqueous mixture is a plant processing waste product.

4. The method of claim 3 wherein the plant processing waste product is soy whey.

5. The method of claim 1 or 2 wherein the organic solvent is methanol, ethanol, or isopropanol.

6. The method of claim 1 or 2 wherein the organic solvent is ethanol.

7. The method of claim 1 or 2 which is conducted in a batch reactor.

8. The method of claim 1 or 2 which is conducted in a packed column.

9. The method of claim 1 or claim 2 further comprising the steps of recovering the oligosaccharides raffinose and stachyose from the ultrastabilized, hydrophobic zeolite Y, and hydrolyzing said oligosaccharides into simple sugars.

10. A method for selectively recovering isoflavones and removing the oligosaccharides raffinose and stachyose from an aqueous mixture comprising said isoflavones, said oligosaccharides raffinose and stachyose, and digestible sugars, the method comprising the steps of:

(a) contacting an ultrastabilized, hydrophobic zeolite Y having a Si/Al ratio of about 10 to about 45 with the aqueous mixture, whereby at least a portion of said oligosaccharides raffinose and stachyose bind to said ultrastabilized hydrophobic zeolite Y and is selectively removed from the aqueous mixture, thereby forming an aqueous mixture having an increased proportion of the digestible sugars relative to the oligosaccharides;

(b) separating the ultrastabilized hydrophobic zeolite Y from the aqueous mixture resulting from step (a);

(c) contacting the aqueous mixture remaining after step (b) with a beta zeolite, whereby at least a portion of said isoflavones are adsorbed onto the beta zeolite to form adsorbed isoflavones;

(d) separating the beta zeolite from the aqueous mixture resulting from step (c);

(e) recovering the aqueous mixture remaining after step (d); and (f) contacting the beta zeolite with an organic solvent to release the adsorbed isoflavones.

11. A method of using a beta zeolite and an ultrastabilized, hydrophobic zeolite Y having a Si/Al ratio of about 10 to about 45 for selectively recovering isoflavones and removing the oligosaccharides raffinose and stachyose from an aqueous mixture comprising said isoflavones, said oligosaccharides raffinose and stachyose, and digestible sugars, the method comprising the steps of:

(a) contacting the ultrastabilized, hydrophobic zeolite Y having a Si/Al ratio of about 10 to about 45 with the aqueous mixture, whereby at least a portion of said oligosaccharides raffinose and stachyose bind to said ultrastabilized hydrophobic zeolite Y and is selectively removed from the aqueous mixture, thereby forming an aqueous mixture having an increased proportion of the digestible sugars relative to the oligosaccharides;

(b) separating the ultrastabilized hydrophobic zeolite Y from the aqueous mixture resulting from step (a);

(c) contacting the aqueous mixture remaining after step (b) with the beta zeolite, whereby at least a portion of said isoflavones are adsorbed onto the beta zeolite to form adsorbed isoflavones;

(d) separating the beta zeolite from the aqueous mixture resulting from step (c);

(e) recovering the aqueous mixture remaining after step (d); and (f) contacting the beta zeolite with an organic solvent to release the adsorbed isoflavones.

12. The method of claim 10 or 11 wherein the aqueous mixture is a plant processing waste product.

13. The method of claim 12 wherein the plant processing waste product is soy whey.

14. The method of claim 10 or 11 wherein the organic solvent is methanol, ethanol, or isopropanol.

15. The method of claim 10 or 11 wherein the organic solvent is ethanol.

16. The method of claim 10 or 11 which is conducted in a batch reactor.

17. The method of claim 10 or 11 which is conducted in a packed column.

18. The method of claim 10 or claim 11 further comprising the steps of recovering the oligosaccharides raffinose and stachyose from the ultrastabilized hydrophobic zeolite Y, and hydrolyzing said oligosaccharides into simple sugars.

19. A method of using zeolites for selectively recovering isoflavones and removing the oligosaccharides raffinose and stachyose from an aqueous mixture comprising said isoflavones, said oligosaccharides raffinose and stachyose, and digestible sugars, the method comprising the steps of:

(a) contacting the aqueous mixture with at least two zeolites selected from the group consisting of a beta zeolite and an ultrastabilized, hydrophobic zeolite Y having a Si/Al ratio of about 10 to about 45, whereby at least a portion of said isoflavones are adsorbed onto the beta zeolite to form adsorbed isoflavones and at least a portion of said oligosaccharides raffinose and stachyose bind to said ultrastabilized hydrophobic zeolite Y and is selectively removed from the aqueous mixture, thereby forming an aqueous mixture having an increased proportion of the digestible sugars relative to the oligosaccharides;

(b) separating the zeolites used in step (a) from the aqueous mixture resulting from step (a);

(c) contacting the beta zeolite with an organic solvent to release the adsorbed isoflavones; and (d) recovering the aqueous mixture remaining after step (b).

* * * * *